(12) United States Patent
Kwak et al.

(10) Patent No.: US 11,805,433 B2
(45) Date of Patent: Oct. 31, 2023

(54) METHOD AND DEVICE FOR TRANSMITTING REFERENCE SIGNAL, CONTROL SIGNAL, AND DATA IN MOBILE COMMUNICATION SYSTEM

(71) Applicant: Samsung Electronics Co., Ltd., Gyeonggi-do (KR)

(72) Inventors: Youngwoo Kwak, Gyeonggi-do (KR); Hoondong Noh, Gyeonggi-do (KR); Cheolkyu Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 384 days.

(21) Appl. No.: 16/334,596

(22) PCT Filed: Sep. 18, 2017

(86) PCT No.: PCT/KR2017/010166
§ 371 (c)(1),
(2) Date: Mar. 19, 2019

(87) PCT Pub. No.: WO2018/052258
PCT Pub. Date: Mar. 22, 2018

(65) Prior Publication Data
US 2021/0282041 A1   Sep. 9, 2021

(30) Foreign Application Priority Data
Sep. 19, 2016   (KR) .................. 10-2016-0119182

(51) Int. Cl.
*H04W 24/10*   (2009.01)
*H04B 17/318*   (2015.01)
(Continued)

(52) U.S. Cl.
CPC .......... *H04W 24/10* (2013.01); *H04B 17/318* (2015.01); *H04L 5/0057* (2013.01); *H04L 25/0224* (2013.01); *H04L 27/261* (2013.01)

(58) Field of Classification Search
CPC ............................. H04W 24/10; H04B 17/318
See application file for complete search history.

(56) References Cited

U.S. PATENT DOCUMENTS 9,144,045 B2 * 9/2015 Koorapaty ........ H04W 56/0035
2011/0222628 A1 * 9/2011 Chun .................. H04L 25/0206
375/295
(Continued)

FOREIGN PATENT DOCUMENTS

| CN | 105119643 | 12/2015 |
| WO | WO 2016/119652 | 8/2016 |
| WO | WO 2017/171507 | 10/2017 |

OTHER PUBLICATIONS

PCT/ISA/210 Search Report issued on PCT/KR2017/010166 (pp. 5).
(Continued)

*Primary Examiner* — Gennadiy Tsvey
(74) *Attorney, Agent, or Firm* — The Farrell Law Firm, P.C.

(57) ABSTRACT

Disclosed are a communication technique for merging, with an IoT technology, a 5G communication system for supporting a data transmission rate higher than that of a 4G system, and a system therefor. The disclosure can be applied to intelligent services (for example, smart home, smart building, smart city, smart car or connected car, health care, digital education, retail, security and safety related services, and the like) on the basis of 5G communication technology and IoT related technology. A new radio access technology (NR) system, which is novel 5G communication, is designed such that various services can be freely multiplexed in time and frequency resources, thereby enabling channel state information based on an aperiodic CSI-RS or a synchronization signal to be transmitted and received. According to the present invention, a base station in a wireless commu-
(Continued)

nication system transmits channel state information reference signal (CSI-RS) configuration information to a terminal, transmits channel state information feedback configuration information to the terminal, transmits CSI-RS trigger information to the terminal, aperiodically transmits a CSI-RS to the terminal according to the CSI-RS trigger information, and can receive, from the terminal, channel state information generated on the basis of the transmitted CSI-RS, wherein the CSI-RS is configured according to the CSI-RS configuration information, and at least a part of the configured CSI-RS can be transmitted by the CSI-RS trigger information.

8 Claims, 15 Drawing Sheets

(51) Int. Cl.
    *H04L 5/00*       (2006.01)
    *H04L 25/02*     (2006.01)
    *H04L 27/26*     (2006.01)

(56) References Cited

U.S. PATENT DOCUMENTS

| | | | |
|---|---|---|---|
| 2012/0069917 A1 | 3/2012 | Liu et al. | |
| 2012/0106501 A1 | 5/2012 | Kishiyama et al. | |
| 2012/0120910 A1 | 5/2012 | Mazzarese et al. | |
| 2013/0039199 A1* | 2/2013 | Liao | H04B 7/024 370/252 |
| 2013/0301422 A1* | 11/2013 | Caretti | H04B 7/022 370/241 |
| 2014/0254715 A1* | 9/2014 | Bareev | H04B 7/0617 375/296 |
| 2015/0023317 A1* | 1/2015 | Yokomakura | H04L 1/20 370/330 |
| 2015/0098347 A1 | 4/2015 | Guo et al. | |
| 2015/0172940 A1* | 6/2015 | Nagata | H04L 27/2613 370/336 |
| 2015/0195019 A1* | 7/2015 | Nagata | H04L 5/0048 375/267 |
| 2015/0280881 A1* | 10/2015 | Gao | H04W 48/12 370/329 |
| 2015/0350941 A1 | 12/2015 | You et al. | |
| 2016/0013984 A1* | 1/2016 | Sun | H04W 24/08 370/252 |
| 2016/0037538 A1* | 2/2016 | Li | H04W 24/10 370/329 |
| 2016/0043828 A1 | 2/2016 | Love et al. | |
| 2016/0205574 A1* | 7/2016 | Behravan | H04W 36/0088 370/252 |
| 2016/0249279 A1 | 8/2016 | Koorapaty et al. | |
| 2016/0269084 A1 | 9/2016 | Nam et al. | |
| 2016/0278030 A1* | 9/2016 | Yi | H04W 16/32 |
| 2017/0070312 A1* | 3/2017 | Yi | H04W 72/541 |
| 2017/0215097 A1* | 7/2017 | Park | H04B 17/318 |
| 2017/0332264 A1* | 11/2017 | Mo | H04W 24/08 |
| 2017/0339714 A1* | 11/2017 | Harada | H04L 5/0012 |
| 2018/0019855 A1 | 1/2018 | Zhang et al. | |
| 2018/0054786 A1* | 2/2018 | Yamada | H04W 24/10 |
| 2018/0091964 A1* | 3/2018 | Adachi | H04W 8/00 |
| 2018/0192314 A1* | 7/2018 | Takahashi | H04W 24/10 |
| 2018/0206138 A1* | 7/2018 | Hayashi | H04W 24/10 |
| 2018/0227838 A1* | 8/2018 | Hayashi | H04W 72/042 |
| 2018/0332511 A1* | 11/2018 | Fan | H04W 36/0094 |

OTHER PUBLICATIONS

PCT/ISA/237 Written Opinion issued on PCT/KR2017/010166 (pp. 6).
LG Electronics, 3GPP TSG RAN WG1 Meeting #86, R1-166901, Gothenburg, Sweden, Aug. 13, 2016, Discussion on CSI-RS design and CSI procedure, pp. 7.
Intel Corporation (UK), "Remaining Aspects of CSI-RS and PDSCH Muting Configurations", R1-106229, 3GPP TSG RAN WG1 #63, Nov. 11-15, 2010, 3 pages.
Panasonic, "Synchronization of L1 Parameter from System Information (Reply to: R2-082898)", R1-082415, 3GPP TSG RAN WG1 Meeting #53bis, Jun. 30-Jul. 4, 2008, 4 pages.
Motorola, "Downlink Power Control for E-UTRA", R1-061717, 3GPP TSG RAN1 LTE AdHoc, Jun. 27-30, 2006, 1 page.
European Search Report dated Jul. 14, 2020 issued in counterpart application No. 17851132.5-1205, 22 pages.
LG Electronics, "Remaining Details on Intra-cell CSI-RS in Rel-10", R1-105655, 3GPP TSG RAN WG1 Meeting #62bis, Oct. 11-15, 2010, 3 pages.
Sharp, "Discovery Signal Design for Small Cell", R1-141326, 3GPP TSG RAN WG1 Meeting #76bis, Mar. 31-Apr. 4, 2014, 4 pages.
European Search Report dated Mar. 12, 2020 issued in counterpart application No. 17851132.5-1205, 19 pages.
Chinese Office Action dated Jun. 2, 2021 issued in counterpart application No. 201780057595.6, 20 pages.
Nokia Networks, "Beam Offloading in Elevation BF/FD MIMO", R1-157387, 3GPP TSG-RAN WG1 Meeting #83, Nov. 15-22, 2015, 3 pages.
Intel Corportion, "On CSI Measurements and Feedback", R1-156503, 3GPP TSG RAN WG1 Meeting #83, Nov. 16-20, 2015, 3 pages.
Korean Office Action dated Sep. 8, 2023 issued in counterpart application No. 10-2016-0119182, 7 pages.

* cited by examiner

METHOD AND DEVICE FOR TRANSMITTING REFERENCE SIGNAL, CONTROL SIGNAL, AND DATA IN MOBILE COMMUNICATION SYSTEM

TECHNICAL FIELD

The present invention relates to a wireless communication system and, more particularly, to a channel state information reference signal to be used in a 5G communication system and to a method for measuring and reporting a channel state.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The 5G wireless communication system (hereinafter used interchangeably with new radio access technology) being currently studied may provide services such as an enhanced mobile broadband (eMBB), a massive machine type communication (mMTC), and ultra-reliable and low-latency communications (URLLC). The eMBB is a service for a high-speed transmission of high-capacity data, the mMTC is a service for minimizing terminal power and allowing access of multiple terminals, and the URLLC is a service for high reliability and low latency. In addition to the above services, a forward compatible resource (FCR) may be set for future services. The FCR is set to prevent the transmission of data and a reference signal for existing terminals from affecting forward services of terminals. When this resource is set, a terminal does not receive data, a control channel, and a reference signal, and also an uplink signal may not be transmitted.

In particular, when there is a reference signal, especially a channel state information reference signal (CSI-RS), which is fixedly transmitted in time and frequency resources of the NR system, it may be difficult to flexibly support the above-mentioned various services for the existing LTE system and future additional NR services. Therefore, even though the transmission of such a reference signal should be minimized, it may be difficult to obtain the minimum channel state information between a base station and a terminal when the corresponding reference signal does not exist.

DISCLOSURE OF INVENTION

Technical Problem

It is an object of the present invention to provide a method and device for efficiently reporting channel state information. In particular, proposed are a method and device for performing the measurement and report of channel state information and interference characteristics by considering an alternative manner when CSI-RS transmission is not guaranteed.

Solution to Problem

In order to accomplish the above objects, a method of a base station in a wireless communication system according to the present invention comprises transmitting channel state information reference signal (CSI-RS) configuration information to a terminal; transmitting channel state information feedback configuration information to the terminal; transmitting CSI-RS trigger information to the terminal; aperiodically transmitting a CSI-RS to the terminal according to the CSI-RS trigger information; and receiving channel state information generated based on the CSI-RS from the terminal, wherein the CSI-RS is configured according to the CSI-RS configuration information, and at least a part of the configured CSI-RS is transmitted based on the CSI-RS trigger information.

The method may further comprise transmitting a synchronization signal; and receiving channel state information based on the synchronization signal from the terminal. In addition, the channel state information based on the synchronization signal may include at least one of wideband channel state information or subband channel state information. Also, in the wideband channel state information, channel state information for a band in which the synchronization signal is not transmitted may be estimated using interpolation or extrapolation.

In addition, a method of a terminal in a wireless communication system comprises receiving channel state information reference signal (CSI-RS) configuration information from a base station; receiving channel state information feedback configuration information from the base station; receiving CSI-RS trigger information from the base station; aperiodically receiving a CSI-RS from the base station according to the CSI-RS trigger information; and transmitting channel state information generated based on the CSI-RS to the base station, wherein the CSI-RS is configured according to the CSI-RS configuration information, and at least a part of the configured CSI-RS is received based on the CSI-RS trigger information.

In addition, a base station in a wireless communication system comprises a transceiver transmitting and receiving a signal; and a controller controlling to transmit channel state information reference signal (CSI-RS) configuration information to a terminal, to transmit channel state information feedback configuration information to the terminal, to transmit CSI-RS trigger information to the terminal, to aperiodically transmit a CSI-RS to the terminal according to the CSI-RS trigger information, and to receive channel state information generated based on the CSI-RS from the terminal, wherein the CSI-RS is configured according to the CSI-RS configuration information, and at least a part of the configured CSI-RS is transmitted based on the CSI-RS trigger information.

In addition, a terminal in a wireless communication system comprises a transceiver transmitting and receiving a signal; and a controller controlling to receive channel state information reference signal (CSI-RS) configuration information from a base station, to receive channel state information feedback configuration information from the base station, to receive CSI-RS trigger information from the base station, to aperiodically receive a CSI-RS from the base station according to the CSI-RS trigger information, and to transmit channel state information generated based on the CSI-RS to the base station, wherein the CSI-RS is configured according to the CSI-RS configuration information, and at least a part of the configured CSI-RS is received based on the CSI-RS trigger information.

Advantageous Effects of Invention

According to an embodiment of the present invention, even if the CSI-RS transmission for channel state information measurement is not guaranteed, the terminal can measure channel state information by using an alternative manner. Therefore, even if the CSI-RS transmission is not performed or not set, it is possible to obtain the channel state information for link information.

MODE FOR THE INVENTION

Figure 1:
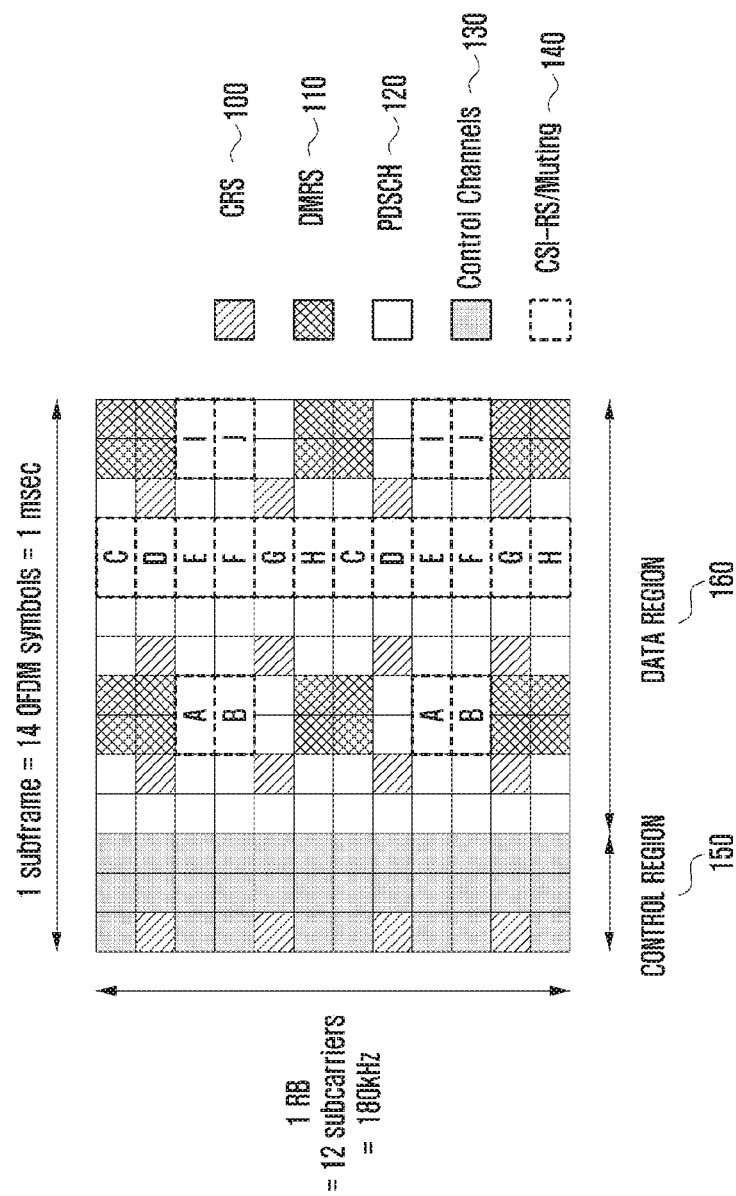
FIG. 1 shows resources of one subframe and one resource block (RB) which are the minimum unit of downlink scheduling in LTE and LTE-A systems.

Currently outgrowing the provision of an initial voice-oriented service, a mobile communication system is evolving into a high-speed, high-quality wireless packet data communication system for providing a data service and a multimedia service. For this, standardization organizations such as 3GPP, 3GPP2, and IEEE are working on the standardization of a third-generation evolved mobile communication system to which a multiple access scheme using a multi-carrier is applied. Recently, various mobile communication standards such as long term evolution (LTE) of 3GPP, ultra mobile broadband (UMB) of 3GPP2, and 802.16m of IEEE have been developed to support a high-speed, high-quality wireless packet data transmission service, based on a multiple access scheme using a multi-carrier.

The existing third-generation evolved mobile communication system such as LTE, UMB, or 802.16m is based on a multi-carrier multiple access scheme, applies a multiple input multiple output (MIMO) scheme in order to improve a transmission efficiency, and has a feature of using various techniques such as beam-forming, adaptive modulation and coding (AMC), and channel sensitive scheduling.

The above various techniques improve transmission efficiency and improve a system capacity performance by concentrating transmission power or adjusting the amount of data transmitted from several antennas according to a channel quality or the like and by selectively transmitting data to a user having a good channel quality. Because most of these techniques are based on channel state information between a base station (BS) (also referred to as an evolved Node B (eNB)) and a terminal (also referred to as a user equipment (UE) or a mobile station (MS)), the eNB or UE needs to measure a channel state therebetween. What used at this time is a channel status indication reference signal or channel state information reference signal (CSI-RS).

The above-mentioned eNB refers to a downlink transmission and uplink reception device located in a certain place, and one eNB performs transmission and reception with respect to a plurality of cells. In one mobile communication system, many eNBs are geographically distributed, and each eNB performs transmission and reception for a plurality of cells.

The existing third-generation and fourth-generation mobile communication systems such as LTE and LTE-A utilize MIMO technique using a plurality of transmission/ reception antennas in order to increase a data transmission rate and a system capacity. According to the MIMO technique, a transmitter spatially separates and transmits a plurality of information streams by utilizing a plurality of transmission/reception antennas. This operation of spatially separating and transmitting a plurality of information streams is referred to as spatial multiplexing. Generally, the number of information streams to which the spatial multiplexing can be applied depends on the number of transmitter antennas and receiver antennas. In general, the number of information streams to which the spatial multiplexing can be applied is referred to as the rank of corresponding transmission. In case of the MIMO technique supported in standards from the LTE to the LTE-A Release 11, the spatial multiplexing is supported for up to 16 transmission antennas and 8 reception antennas, and the rank is supported for up to 8.

In case of NR (New Radio access technology) which is the fifth-generation mobile communication system currently being discussed, it is a design goal of the system to support various services such as eMBB, mMTC and URLLC mentioned above. To achieve this goal, the NR system minimizes a reference signal which is always transmitted, and aperiodically transmits the reference signal, thereby allowing the flexible use of time and frequency resources.

Now, embodiments of the present invention will be described in detail with reference to the accompanying drawings.

In the following description of embodiments, descriptions of techniques that are well known in the art and not directly related to the present invention are omitted. This is to clearly convey the subject matter of the invention by omitting any unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to the embodiments described in detail below and with reference to the accompanying drawings. The present invention may, however, be embodied in many different forms and should not be construed as being limited to the embodiments set forth herein. Rather, these embodiments are provided so that this invention will be thorough and complete and will fully convey the scope of the invention to those skilled in the art. To fully disclose the scope of the invention to those skilled in the art, the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, refers to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

In describing the present invention, a detailed description of a known function or configuration will be omitted when it can unnecessarily obscure the subject matter of the present invention. In addition, the following terms are defined in consideration of the functions of the present invention, and may be changed according to the intention of the user, the operator, or the like. Therefore, the definition should be based on the contents throughout this specification.

Although the NR system and the LTE and LTE-A systems are used for describing the present invention in this disclosure, the present invention can be also applied to any other communication system.

FIG. 1 shows resources of one subframe and one resource block (RB) which are the minimum unit of downlink scheduling in LTE and LTE-A systems.

A radio resource shown in FIG. 1 is formed of one subframe on the time axis and is formed of one RB on the frequency axis. Such a radio resource is composed of 12 subcarriers in the frequency domain and is composed of 14 OFDM symbols in the time domain, thus having a total of 168 frequency and time positions. In the LTE and LTE-A systems, each frequency and time position in FIG. 1 is referred to as a resource element (RE).

In the radio resource shown in FIG. 1, a plurality of different types of signals may be transmitted.

1. Cell-specific Reference Signal (CRS) 100: This is a reference signal periodically transmitted for all terminals belonging to one cell and may be commonly used by a plurality of terminals.

2. Demodulation Reference Signal (DMRS) 110: This is a reference signal transmitted for a specific terminal and is transmitted only for transmission of data to the corresponding terminal. The DMRS may be composed of a total of eight DMRS antenna ports (hereinafter, interchangeably used with ports). In the LTE and LTE-A, ports from 7 to 14 correspond to the DMRS ports and maintain orthogonality by using code division multiplexing (CDM) or frequency division multiplexing (FDM) so as to prevent interference.

3. Physical Downlink Shared Channel (PDSCH) 120: This is a data channel transmitted in the downlink, used by a base station for transmitting traffic to a terminal, and transmitted using an RE through which a reference signal is not transmitted in a data region 160 of FIG. 1.

4. CSI-RS 140: This is a reference signal transmitted for terminals belonging to one cell and is used to measure a channel state. A plurality of CSI-RSs may be transmitted for one cell.

5. Other control channels 130: Other control channels are transmitted in a control region 150 and include a physical HARQ indicator channel (PHICH), a physical control format indicator channel (PCFICH), and a physical downlink control channel (PDCCH). These control channels provide control information necessary for a terminal to receive the PDSCH or transmit ACK/NACK for operating the HARQ for uplink data transmission.

In the LTE-A system, a muting may be set so that the CSI-RS transmitted by another base station can be received to terminals of the corresponding cell without interference. The muting may be applied at a position where the CSI-RS can be transmitted, and a terminal receives a traffic signal by skipping the corresponding radio resource. In the LTE-A system, the muting is also referred to as zero-power CSI-RS because the muting is applied to the position of the CSI-RS and there is no transmission power at this position.

In FIG. 1, the CSI-RS may be transmitted using a part of positions indicated by A, B, C, D, E, E, F, G, H, I, and J according to the number of antenna ports used to transmit the CSI-RS. In addition, the muting may be applied to a part of the positions indicated by A, B, C, D, E, E, F, G, H, I, and J. In particular, depending on the number of antenna ports configured, the CSI-RS may be transmitted on two, four, or eight REs. In FIG. 1, the CSI-RS is transmitted using the half of a specific pattern in case of two antenna ports, transmitted using the entire specific pattern in case of four antenna ports, and transmitted using two patterns in case of eight antenna ports.

On the other hand, the muting is always done in one pattern unit. That is, the muting can be applied to a plurality of patterns and cannot be applied to only a part of one pattern when a muting position does not overlap with a CSI-RS position. However, the muting can be applied only to a part of one pattern only when a muting position overlaps with a CSI-RS position. When the CSI-RS is transmitted for two antenna ports, signals of the antenna ports are transmitted in two consecutive REs on the time axis, and these signals are distinguished by means of orthogonal codes. In addition, when the CSI-RS is transmitted for four antenna ports, two additional REs are further used to transmit signals for two antenna ports in the same manner. The same is the case where the CSI-RS is transmitted for eight antenna ports. In case of the CSI-RS supporting 12 or 16 antenna ports, three CSI-RS transmission positions each for 4 antenna ports may be combined, or two CSI-RS transmission positions each for 8 antenna ports may be combined to perform transmission.

Also, a terminal may receive allocated CSI-IM (or interference measurement resources (IMR)) together with the CSI-RS, and the CSI-IM resource has the same resource structure and position as those of the CSI-RS that supports four ports. The CSI-IM is a resource for a terminal performing data reception from one or more base stations to accurately measure interference from a neighboring base station. For example, when desiring to measure the amount of interference in case where a neighboring base station transmits data or does not transmit data, a base station can effectively measure the interference amount of the neighboring base station by configuring the CSI-RS and two CSI-IM resources such that the neighboring base station always transmits a signal in one CSI-IM and does not always transmit a signal in the other CSI-IM.

Table 1 below shows a radio resource control (RRC) field for constituting the CSI-RS configuration.

TABLE 1

| CSI-RS config | CSI-IM config | CQI report config | Etc |
|---|---|---|---|
| No. antenna ports | Resource config | Periodic | $P_C$ |
| Resource config | Time and frequency | Mode, resource, | Codebook subset |
| Time and frequency | position in a subframe | periodicity, offset . . . | restriction |
| position in a subframe | Subframe config | Aperiodic | |
| Subframe config | Periodicity and subframe | Mode.. | |
| Periodicity and subframe | offset | PMI/RI report | |
| offset | | RI reference CSI | |
| Qcl-CRS-info (QCL | | process | |
| Type B) | | SubframePattern | |
| CRS information for CoMP | | | |

The configuration for a channel state reporting based on a periodic CSI-RS in a CSI process may be classified into four types as shown in Table 1. First, the CSI-RS config is for configuring the frequency and time position of a CSI-RS RE. Here, through configuration for the number of antennas, it is configured how many ports the corresponding CSI-RS has. The resource config is to configure the RE position in an RB, and the subframe config is to configure the periodicity and offset of a subframe.

Tables 2 and 3 below are tables for the resource config and the subframe config currently supported in the LTE.

TABLE 2

| | CSI Reference signal configuration | Number of CSI reference signals configured | | | | | |
|---|---|---|---|---|---|---|---|
| | | 1 or 2 | | 4 | | 8 | |
| | | (k', l') | $\eta_s$ mod 2 | (k', l') | $\eta_s$ mod 2 | (k', l') | $\eta_s$ mod 2 |
| frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

A terminal can check the frequency and time position of the CSI-RS, periodicity and offset through Tables 2 and 3 above. The Qcl-CRS-info is to configure quasi-co-location information for Coordinated Multi Point (CoMP).

Second, the CSI-IM config is to configure the frequency and time position of the CSI-IM for measuring interference. Because the CSI-IM is always configured based on four ports, the number of antenna ports is not necessary. The resource config and the subframe config are configured in the same way as in the CSI-RS.

Third, the CQI report config exists to configure how to perform a channel state reporting by using the corresponding CSI process. In this configuration, there are periodic channel state report configuration, aperiodic channel state report configuration, PMI/RI report configuration, RI reference CSI process configuration, and subframe pattern configuration.

A subframe pattern is for configuring a measurement subframe subset for supporting channel and interference measurement having different characteristics in time in the channel and interference measurement received by a terminal. The measurement subframe subset was first introduced for estimation in consideration of different interference characteristics between an almost blank subframe (ABS) and a non-ABS normal subframe in the enhanced Inter-Cell Interference Coordination (eICIC). Thereafter, in order to measure different channel characteristics between a subframe always operating in the DL and a subframe dynamically switchable from the DL to the UL in the enhanced Interference Mitigation and Traffic Adaptation (eIMTA), it has been developed into an improved form capable of configuring two IMRs for measurement.

Tables 4 and 5 below show the measurement subframes subsets for supporting the eICIC and the eIMTA.

TABLE 4

```
CQI-ReportConfig-r10 ::= SEQUENCE {
    cqi-ReportAperiodic-r10        CQI-ReportAperiodic-r10
    OPTIONAL, -- Need ON
    nomPDSCH-RS-EPRE-Offset        INTEGER (–1..6),
    cqi-ReportPeriodic-r10         CQI-ReportPeriodic-r10        OPTIONAL,
    -- Need ON
```

TABLE 4-continued

```
pmi-RI-Report-r9                    ENUMERATED {setup}    OPTIONAL,
-- Cond PMIRIPCell
csi-SubframePatternConfig-r10       CHOICE {
    release                             NULL,
    setup                               SEQUENCE {
        csi-MeasSubframeSet1-r10            MeasSubframePattern-r10,
        csi-MeasSubframeSet2-r10            MeasSubframePattern-r10
    }
}                                                          OPTIONAL -- Need ON
}
```

TABLE 5

```
CQI-ReportConfig-v1250 ::=    SEQUENCE {
    csi-SubframePatternConfig-r12    CHOICE {
        release                          NULL,
        setup                            SEQUENCE {
            csi-MeasSubframeSets-r12         BIT STRING (SIZE (10))
        }
    }                                                   OPTIONAL, -- Need ON
    cqi-ReportBoth-v1250            CQI-ReportBoth-v1250    OPTIONAL,
-- Need ON
    cqi-ReportAperiodic-v1250 CQI-ReportAperiodic-v1250    OPTIONAL,  --
Need ON
    altCQI-Table-r12                ENUMERATED {
                                        allSubframes, csi-SubframeSet1,
                                        csi-SubframeSet2, spare1}    OPTIONAL  --
Need OP
}
```

The eICIC measurement subframe subset supported in the LTE system is configured using csi-MeasSubframeSet1-r10 and csi-MeasSubframeSet2-r10. MeasSubframePattern-r10 referred to by the corresponding field is as shown in Table 6 below.

TABLE 6

```
-- ASN1START
MeasSubframePattern-r10 ::= CHOICE {
    subframePatternFDD-r10      BIT STRING (SIZE (40)),
    subframePatternTDD-r10      CHOICE {
        subframeConfig1-5-r10       BIT STRING (SIZE (20)),
        subframeConfig0-r10         BIT STRING (SIZE (70)),
        subframeConfig6-r10         BIT STRING (SIZE (60)),
        . . .
    },
    . . .
}
-- ASN1START
```

In the above field, the left MSB indicates the subframe #0, and 1 indicates that it is included in the corresponding measurement subframe subset. Unlike the eICIC measurement subframe subset in which each subframe set is configured through each field, the eIMTA measurement subframe subset uses one field to indicate 0 as the first subframe set and 1 as the second subframe set. Therefore, while in the eICIC the corresponding subframe may not be included in two subframe sets, the eIMTA subframe set should be always included in one of two subframe sets.

Fourth, there are a power ratio, $P_C$, between a PDSCH and a CSI-RS RE required for generating a channel state report at a terminal, a codebook subset restriction for setting which codebook to be used for, and the like. The $P_C$ and the codebook subset restriction are configured by the p-C-AndCBSRList field which includes two P-C-AndCBSR fields shown in Table 8 in the form of list, and each field represents configuration for each subframe subset.

TABLE 7

```
CSI-Process-r11 ::= SEQUENCE {
    . . .
    p-C-AndCBSRList-r11 SEQUENCE (SIZE (1 .. 2)) OF
    P-C-AndCBSR-r11,
    . . .
}
```

TABLE 8

```
P-C-AndCBSR-r11 ::= SEQUENCE {
    p-C-r11                     INTEGER (-8..15),
    codebookSubsetRestriction-r11    BIT STRING
}
```

The $P_C$ may be defined as shown in Equation 1 below, and a value between −8 dB and 15 dB may be specified.

$$P_C = \frac{PDSCH\ EPRE}{CSI-RS\ EPRE} \qquad \text{[Equation 1]}$$

A base station may variably adjust the CSI-RS transmission power for various purposes such as improving the channel estimation accuracy, and a terminal may know through the notified $P_C$ how much lower or higher the transmission power to be used for data transmission is than the transmission power used for channel estimation. For this reason, even if the base station varies the CSI-RS transmission power, the terminal can calculate the correct CQI and report it to the base station.

The codebook subset restriction is a function of enabling a base station to not report codepoints of a codebook supported by the standard to a terminal according to the number of CRS or CSI-RS ports of the base station. This codebook subset restriction may be configured by the codebookSubsetRestriction field included in AntennaInfoDedicated of Table 9 below.

TABLE 9

```
AntennaInfoDedicated ::=          SEQUENCE {
    transmissionMode                  ENUMERATED {
                                      tm1, tm2, tm3, tm4, tm5, tm6,
                                      tm7, tm8-v920},
    codebookSubsetRestriction         CHOICE {
        n1txAntenna-tm3                   BIT STRING (SIZE (2)),
        n4TxAntenna-tm3                   BIT STRING (SIZE (4)),
        n1txAntenna-tm4                   BIT STRING (SIZE (6)),
        n4TxAntenna-tm4                   BIT STRING (SIZE (64)),
        n1txAntenna-tm5                   BIT STRING (SIZE (4)),
        n4TxAntenna-tm5                   BIT STRING (SIZE (16)),
        n1txAntenna-tm6                   BIT STRING (SIZE (4)),
        n4TxAntenna-tm6                   BIT STRING (SIZE (16))
    }       OPTIONAL,                                             -- Cond TM
    ue-TransmitAntennaSelection       CHOICE{
        release                           NULL,
        setup                             ENUMERATED {closedLoop, openLoop}
    }
}
AntennaInfoDedicated-v920 ::=     SEQUENCE {
    codebookSubsetRestriction-v920    CHOICE {
        n1txAntenna-tm8-r9                BIT STRING (SIZE (6)),
        n4TxAntenna-tm8-r9                BIT STRING (SIZE (32))
    }       OPTIONAL                                              -- Cond TM8
}
AntennaInfoDedicated-r10 ::=      SEQUENCE {
    transmissionMode-r10              ENUMERATED {
                                      tm1, tm2, tm3, tm4, tm5, tm6, tm7, tm8-v920,
                                      tm9-v1020, tm10-v1130, spare6, spare5,
spare4,
                                      spare3, spare2, spare1},
    codebookSubsetRestriction-r10     BIT STRING      OPTIONAL,
        -- Cond TMX
    ue-TransmitAntennaSelection       CHOICE{
        release                           NULL,
        setup                             ENUMERATED {closedLoop, openLoop}
    }
}
```

The codebookSubsetRestriction field is formed of a bitmap, and the size of the bitmap is the same as the number of codepoints of the corresponding codebook. Thus, each bitmap represents each codepoint. If the corresponding value is 1, a terminal can report the corresponding codepoint to a base station through PMI. If the value is 0, a terminal cannot report the codepoint to a base station via PMI. For reference, the MSB represents a high precoder index, and the LSB represents a low precoder index (e.g., 0).

In the cellular system, a base station should transmit a reference signal to a terminal in order to measure a downlink channel state. In case of the LTE-A system, the terminal measures a channel state between the base station and the terminal by using a CRS or CSI-RS transmitted from the base station. The channel state basically needs to consider several factors including the amount of interference in the downlink. The amount of interference in the downlink includes an interference signal and a thermal noise caused by an antenna of a neighboring base station, and this interference amount is important for the terminal to determine the downlink channel state. For example, when a base station having one transmission antenna transmits a signal to a terminal having one reception antenna, the terminal should determine, by using a reference signal received from the base station, the energy per symbol to be received in the downlink and the amount of interference to be received simultaneously in the symbol reception interval and thereby determine Es/Io (the ratio of energy per symbol to interference amount). The determined Es/Io is converted into a data transmission rate or a corresponding value and is notified to the base station in the form of a channel quality indicator (CQI). Therefore, the base station can determine a data transmission rate for downlink transmission to the terminal.

In case of the LTE-A system, a terminal feeds back information on a downlink channel state to a base station so that it can be utilized for downlink scheduling of the base station. That is, the terminal measures a reference signal transmitted from the base station in the downlink and provides, as feedback, extracted information to the base station in a form defined by the LTE and LTE-A standards. In the LTE and LTE-A systems, there are three types of feedback information of the terminal, as follows.

Rank Indicator (RI): The number of spatial layers that a terminal can receive in the current channel state Precoder Matrix Indicator (PMI): Indicator for a precoding matrix preferred by a terminal in the current channel state Channel Quality Indicator (CQI): The maximum data rate that a terminal can receive in the current channel state. The CQI can be replaced with an SINR utilized in a manner similar to the maximum data rate, the maximum error correction coding rate and modulation scheme, data efficiency per frequency, or the like.

The RI, the PMI, and the CQI have a correlative meaning. For example, a precoding matrix supported in the LTE and LTE-A systems is defined differently by rank. Therefore, a PMI value in case of an RI value of 1 and a PMI value in case of an RI value of 2 are interpreted differently even if both values are the same. In addition, when determining the CQI, the terminal assumes that a rank value and a PMI value notified to the base station have been applied at the base station. That is, in case where the terminal notifies RI_X, PMI_Y, and CQI_Z to the base station, this means that the terminal can receive a data rate corresponding to CQI_Z when the rank is RI_X and the applied precoding matrix is PMI_Y. In this way, when calculating the CQI, the terminal assumes a transmission scheme to be performed by the base station, thereby obtaining the optimized performance when performing actual transmission according to the transmission scheme.

In the LTE and LTE-A systems, the periodic feedback of a terminal is set as one of the following four feedback modes, depending on which information is included.

Reporting mode 1-0 (wideband CQI with no PMI): RI, wideband (or used interchangeably with broadband) CQI (wCQI)

Reporting mode 1-1 (wideband CQI with single PMI) :: RI, wCQI, PMI

Reporting mode 2-0 (subband CQI with no PMI) :: RI, wCQI, subband CQI (sCQI)

Reporting mode 2-1 (subband CQI with single PMI) :: RI, wCQI, sCQI, PMI

The feedback timing of information on each feedback mode is determined by values of $N_{pd}$, $N_{OFFSET,CQI}$, $M_{RI}$, $N_{OFFSET,RI}$, etc. delivered via a higher layer signal. In the feedback mode 1-0, the transmission period of the wCQI is $N_{pd}$, and the feedback timing is determined with a subframe offset value of $N_{OFFSET,CQI}$. Also, the transmission period of the RI is $N_{pd} \cdot M_{RI}$, and the offset is $N_{OFFSET,CQI} + N_{OFFSET,RI}$.

The feedback mode 1-1 has the same feedback timing as in the mode 1-0 but has a difference that the wCQI and PMI are transmitted together at the wCQI transmission timing.

In the feedback mode 2-0, the feedback period for the sCQI is $N_{pd}$, and the offset value is $N_{OFFSET,CQI}$. The feedback period for the wCQI is $H \bullet\bullet N_{pd}$, and the offset value is $N_{OFFSET,CQI}$ as the offset value of the sCQI. Here, $H=J\bullet\bullet k+1$, where K is delivered with a higher layer signal, and J is a value determined according to a system bandwidth. For example, the J value for a 10 MHz system is defined as 3. As a result, the wCQI is transmitted once for every H-times sCQI transmissions. In addition, the transmission period of the RI is $M_{RI} \cdot H \bullet\bullet N_{pd}$, and the offset is $N_{OFFSET,CQI} + N_{OFFSET,RI}$.

The feedback mode 2-1 has the same feedback timing as in the mode 2-0 but has a difference that the PMI is transmitted together at the wCQI transmission timing.

The above-described feedback timing corresponds to a case where the number of CSI-RS antenna ports is four or less. Contrary to the above feedback timing, a terminal to which the CSI-RS for eight antenna ports is allocated should feedback two types of PMI information.

For eight CSI-RS antenna ports, the feedback mode 1-1 is divided into two submodes. In the first submode, the RI is transmitted together with the first PMI information, and the second PMI information is transmitted together with the wCQI. Here, the feedback period and the offset for the wCQI and the second PMI are defined as $N_{pd}$ and $N_{OFFSET,CQI}$, respectively, and the feedback period and the offset for the RI and the first PMI information are defined as $M_{RI} \cdot N_{pd}$ and $N_{OFFSET,CQI} + N_{OFFSET,RI}$, respectively. Here, if a precoding matrix corresponding to the first PMI is W1 and if a precoding matrix corresponding to the second PMI is W2, a terminal and a base station share information that a precoding matrix preferred by the terminal is determined as W1W2.

In case of the feedback mode 2-1 for eight CSI-RS antenna ports, feedback of precoding type indicator (PTI) information is added. The PTI is fed back together with the RI, the period thereof is $M_{RI} \cdot H \bullet\bullet N_{pd}$, and the offset is defined as $N_{OFFSET,CQI} + N_{OFFSET,RI}$. If the PTI is 0, all of the first PMI, the second PMI, and the wCQI are fed back. The wCQI and the second PMI are transmitted together at the same timing, the period thereof is $N_{pd}$, and the offset is given by $N_{OFFSET,CQI}$. In addition, the period of the first PMI is $H' \bullet\bullet N_{pd}$, and the offset is $N_{OFFSET,CQI}$. Here, H' is delivered via a higher layer signal. On the other hand, if the PTI is 1, the PTI is transmitted together with the RI, the wCQI and the second PMI are transmitted together, and the sCQI is further fed back at a separate timing. In this case, the first PMI is not transmitted. The period and offset of the PTI and RI are the same as in case where the PTI is 0, and the period and offset of the sCQI are defined as $N_{pd}$ and $N_{OFFSET,CQI}$. Also, the wCQI and the second PMI are fed back with the period of $H \bullet\bullet N_{pd}$ and the offset of $N_{OFFSET,CQI}$, and H is defined as in case where the number of CSI-RS antenna ports is four.

The LTE and LTE-A systems support aperiodic feedback as well as periodic feedback of a terminal. When a base station desires to acquire aperiodic feedback information of a specific terminal, the base station performs uplink data scheduling of the terminal by setting an aperiodic feedback indicator contained in downlink control information (DCI) for the uplink data scheduling to perform a specific aperiodic feedback. When receiving, at the $n^{th}$ subframe, the indicator set to perform the aperiodic feedback, the terminal performs uplink transmission including the aperiodic feedback information in the uplink data transmission at the $(n+k)^{th}$ subframe. Here, k which is a parameter defined in the 3GPP LTE Release 11 standard is 4 in case of frequency division duplexing (FDD) and is defined as shown in Table 10 below in case of time division duplexing (TDD).

TABLE 10

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When the aperiodic feedback is set, feedback information includes the RI, the PMI, and the CQI as in case of the periodic feedback, and the RI and the PMI may not be fed back according to feedback setup. The CQI may include both the wCQI and the sCQI or may include only the wCQI information.

In the LTE and LTE-A systems, a codebook subsampling function is also provided for periodic channel state reporting. In the LTE and LTE-A systems, the periodic feedback of the terminal is transmitted to the base station via the PUCCH, and the amount of information that can be transmitted through the PUCCH at a time is limited. Therefore, various feedback objects such as RI, wCQI, sCQI, PMI1, wPMI2, and sPMI2 may be transmitted on the PUCCH through subsampling, or two or more types of feedback information may be jointly encoded and transmitted on the PUCCH.

For example, when the number of CSI-RS ports configured by the base station is 8, the RI and the PMI1 reported in the submode 1 of the PUCCH feedback mode 1-1 may be jointly encoded as shown in Table 11 below. Based on Table 11, the RI formed of 3 bits and the PMI1 formed of 4 bits are jointly encoded with 5 bits in total. As shown in Table 12 below, the submode 2 of the feedback mode 1-1 jointly encodes the PMI1 formed of 4 bits and the PMI2 formed of another 4 bits together as a total of 4 bits. In this case, because the level of subsampling is greater than that of the submode 1 (subsampling from four cases to three cases in the submode 1, and subsampling from eight cases to four cases in the submode 2), the terminal cannot report more precoding indexes.

In another example, when the number of CSI-RS ports configured by the base station is 8, the PMI2 reported in the PUCCH feedback mode 2-1 may be sub-sampled as shown in Table 13 below. Referring to Table 13, the PMI2 is reported with 4 bits when the associated RI is 1. However, if the associated RI is 2 or more, a differential CQI for the second codeword should be additionally reported, and therefore the PMI2 is sub-sampled and reported with 2 bits. In the LTE and LTE-A systems, it is possible to apply subsampling or joint encoding for a total of six periodic feedbacks, including Tables 11, 12 and 13 below.

TABLE 11

| value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1}-8)$ |
| 16-17 | 3 | $2(I_{RI/PMI1}-16)$ |
| 18-19 | 4 | $2(I_{RI/PMI1}-18)$ |
| 20-21 | 5 | $2(I_{RI/PMI1}-20)$ |
| 22-23 | 6 | $2(I_{RI/PMI1}-22)$ |
| 24-25 | 7 | $2(I_{RI/PMI1}-24)$ |
| 26 | 8 | 0 |
| 27-31 | reserved | NA |

TABLE 12

| | Relationship between the first PMI value and codebook index $i_1$ | | Relationship between the second PMI value and codebook index $i_2$ | | |
|---|---|---|---|---|---|
| RI | value of the first PMI $I_{PMI1}$ | codebook index $i_1$ | value of the second PMI $I_{PMI2}$ | Codebook index $i_2$ | total #bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4\lfloor I_{PMI2}/4 \rfloor + I_{PM}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

TABLE 13

Relationship between the second PMI value and codebook index $i_2$

| RI | value of the second PMI $I_{PMI2}$ | Codebook index $i_2$ |
|---|---|---|
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |

TABLE 13-continued

Relationship between the second PMI value and codebook index $i_2$

| RI | value of the second PMI $I_{PMI2}$ | Codebook index $i_2$ |
|---|---|---|
| 6 | 0 | 0 |
| 7 | 0 | 0 |
| 8 | 0 | 0 |

Figure 2:
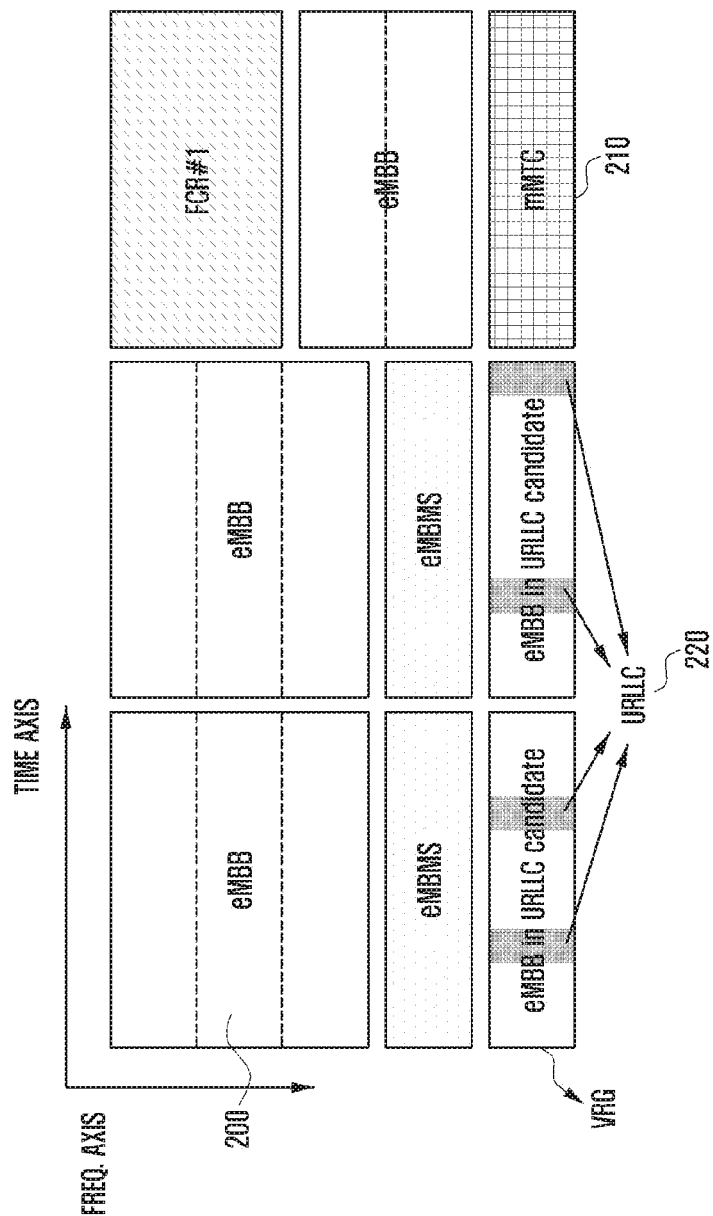
FIG. 2 is a diagram illustrating that data for eMBB, URLLC, mMTC, etc. to be considered in an NR system are allocated together with a forward compatible resource (FCR) in frequency-time resources.

FIG. 2 is a diagram illustrating that data for eMBB, URLLC, mMTC, etc. to be considered in an NR system are allocated together with a forward compatible resource (FCR) in frequency-time resources.

When URLLC data is generated and needs to be transmitted while data 200 and 210 for eMBB and mMTC services are allocated and transmitted in a specific frequency band, a portion pre-allocated for the eMBB and mMTC data is emptied and the URLLC data 220 is transmitted. Because a short delay time is particularly important in the URLLC service, the URLLC data may be allocated to and transmitted via a part of resources to which the eMBB data is allocated. Such eMBB resources may be informed to a terminal in advance. For this, the eMBB data may not be transmitted in a frequency-time resource where the eMBB data and the URLLC data are overlapped. This may lower the transmission performance of the eMBB data. That is, in the above case, a failure in the eMBB data transmission may occur due to the allocation of the URLLC data. In this case, the length of a transmission time interval (TTI) used for the URLLC transmission may be shorter than the TTI length used for the transmission of the eMBB or mMTC service.

When a terminal accesses a wireless communication system, a synchronization signal is used to acquire synchronization with a cell in a network. Specifically, the synchronization signal refers to a reference signal transmitted by a base station for time and frequency synchronization and cell search at the initial access of the terminal. In the LTE system, the base station may transmit signals for synchronization such as a primary synchronization signal (PSS) and a secondary synchronization signal (SSS).

Figure 3:
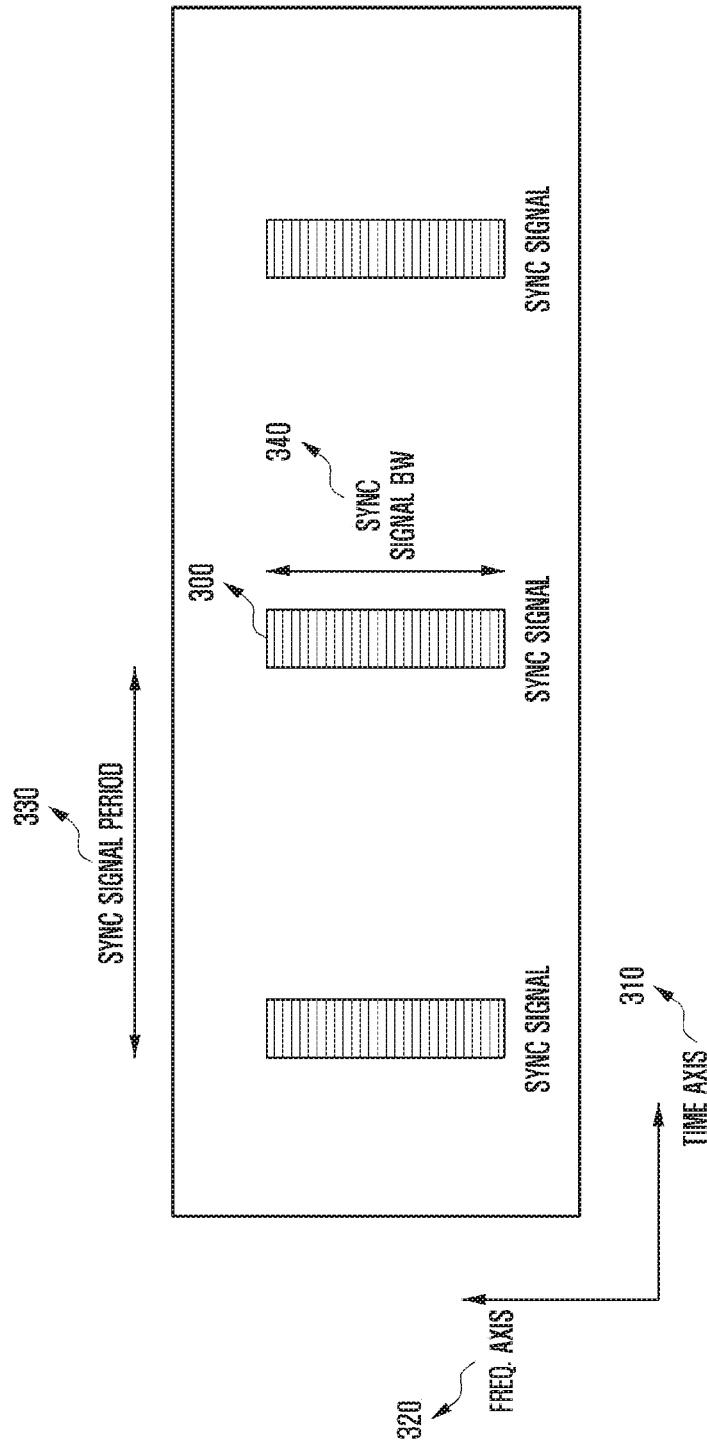
FIG. 3 is a diagram illustrating an embodiment for transmitting a synchronization signal in a 5G communication system considered by the present invention.

FIG. 3 is a diagram illustrating an embodiment for transmitting a synchronization signal in a 5G communication system considered by the present invention. In FIG. 3, the synchronization signal 300 may be transmitted at intervals of a predetermined period 330 on the time axis 310. In addition, the synchronization signal 300 may be transmitted within a certain bandwidth 340 for synchronization signal transmission on the frequency axis 320. The synchronization signal may map a particular sequence to a subcarrier in the transmission bandwidth 340 so as to indicate a cell number (Cell ID). The cell number may be mapped to the synchronization signal by a combination of one or more sequences, so that the terminal may detect a sequence used for the synchronization signal and thereby detect the number of a cell to be accessed.

The sequence used for the synchronization signal may be a sequence having a feature of constant amplitude zero auto correlation (CAZAC), such as the Zadoff-Chu sequence or the Golay sequence, or a pseudo random noise sequence such as the M-sequence or the Gold sequence. Although it is assumed herein that the above-mentioned synchronization signal is used, the present invention is not limited to a specific signal.

The synchronization signal 300 may be formed of one OFDM symbol or a plurality of OFDM symbols. In the latter case, a sequence for a plurality of different synchronization signals may be mapped to each OFDM symbol. For example, similar to cases of the LTE system, three Zadoff-Chu sequences may be used to generate the PSS, and the Gold sequence may be used to generate the SSS. The PSS of one cell may have three different values according to a physical layer cell ID of the cell, and three cell IDs of one cell ID group correspond to different PSSs. Therefore, by detecting the PSS of the cell, the terminal can identify one of three cell ID groups supported in the LTE system. By further detecting the SSS from among 168 cell IDs reduced from 504 cell IDs through the cell ID group identified through the PSS, the terminal finally knows the cell ID of the corresponding cell.

As described above, the terminal synchronizes with the cell in the network, acquires the cell number, and finds the cell frame timing. Once successful, the terminal should receive important cell system information. This information is repeatedly broadcasted by the network, and the terminal needs to know this information in order to access the cell and operate properly in the cell. In the LTE system, the system information is transmitted through two different transmission channels. A limited amount of system information called a master information block (MIB) is transmitted using a physical broadcast channel (PBCH), and a major part of the system information corresponding to a system information block (SIB) is transmitted using a physical downlink shared channel (PDSCH). Specifically, in the LTE system, the system information contained in the MIB includes a downlink transmission bandwidth, PHICH configuration information, and a system frame number (SFN).

Figure 4:
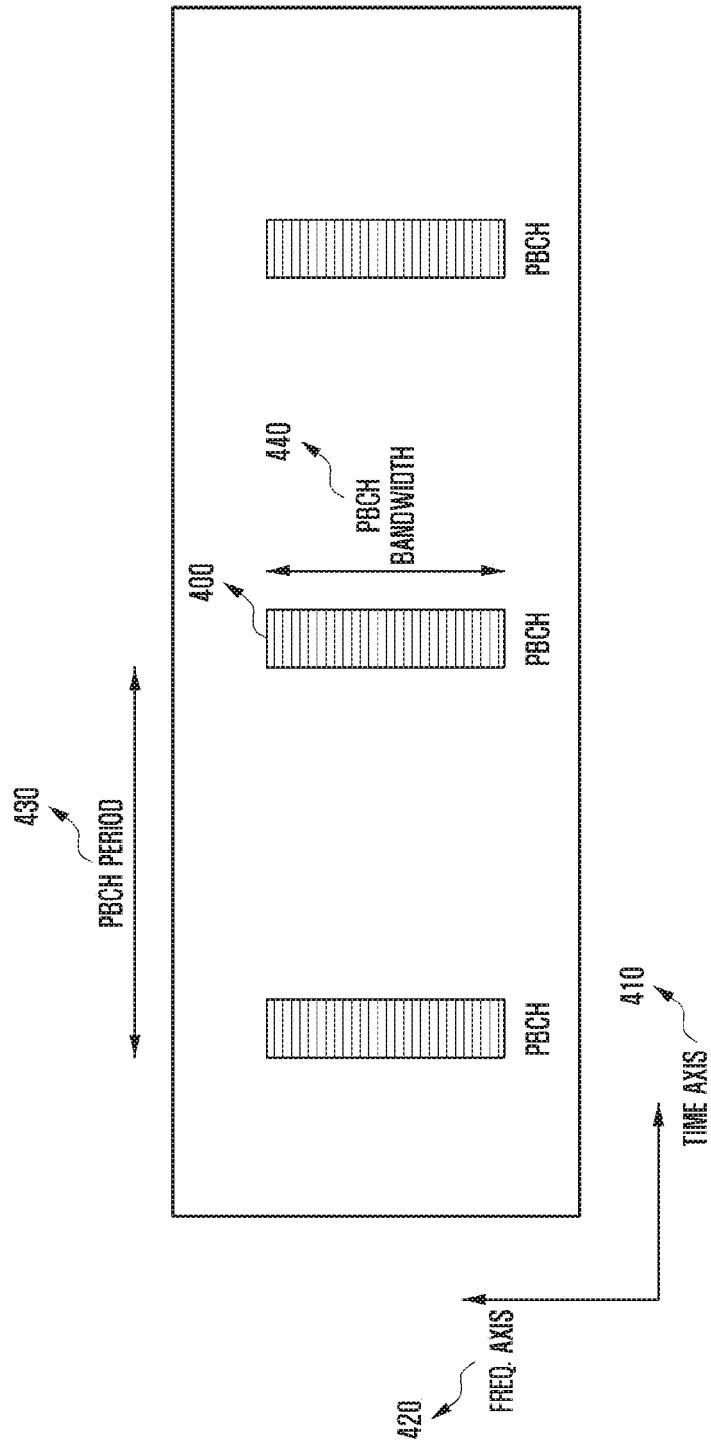
FIG. 4 is a diagram illustrating an embodiment for transmitting a PBCH in a 5G communication system considered by the present invention.

FIG. 4 is a diagram illustrating an embodiment for transmitting a PBCH in a 5G communication system considered by the present invention. In FIG. 4, the PBCH 400 may be transmitted at intervals of a predetermined period 430 on the time axis 410. In addition, the PBCH 400 may be transmitted within a certain bandwidth 440 for PBCH transmission on the frequency axis 420. The base station transmits the same signal at intervals of the predetermined period 430 in order to improve coverage, and the terminal may receive and combine these signals. Also, it is possible to apply a transmission technique such as transmit diversity by using a plurality of antenna ports when transmitting the PBCH. Thus, a diversity gain may be obtained without additional information on a transmission technique used in a receiver.

Although it is assumed herein that the above-mentioned PBCH is used, the present invention is not limited to a specific structure. The PBCH 400 may be formed of a plurality of OFDM symbols in the time-frequency resources as in the current LTE system, or formed to be scattered over the time-frequency resources. The terminal should receive and decode the PBCH in order to receive the system information. In the LTE system, the terminal performs channel estimation for the PBCH by using the CRS.

In the LTE system, the positions of the synchronization signal and the PBCH among main physical layer channels in the time-frequency domain are as follows. In case of positions on the frequency axis, the PSS and the SSS are transmitted via central 6 RBs except for 10 guard subcarriers, and the PBCH is also transmitted via central 6 RBs. In case of positions on the time axis, the positions of the PSS and the SSS are changed depending on whether the cell operates as FDD or TDD, and such positions are distinguished in the time domain within a frame. As in the LTE system, when the synchronization signal and a main physical layer channel such as the PBCH are transmitted at very close positions in the time-frequency domain, estimating such a main physical layer channel by using the synchronization signal can improve the accuracy of the channel estimation.

Figure 5:
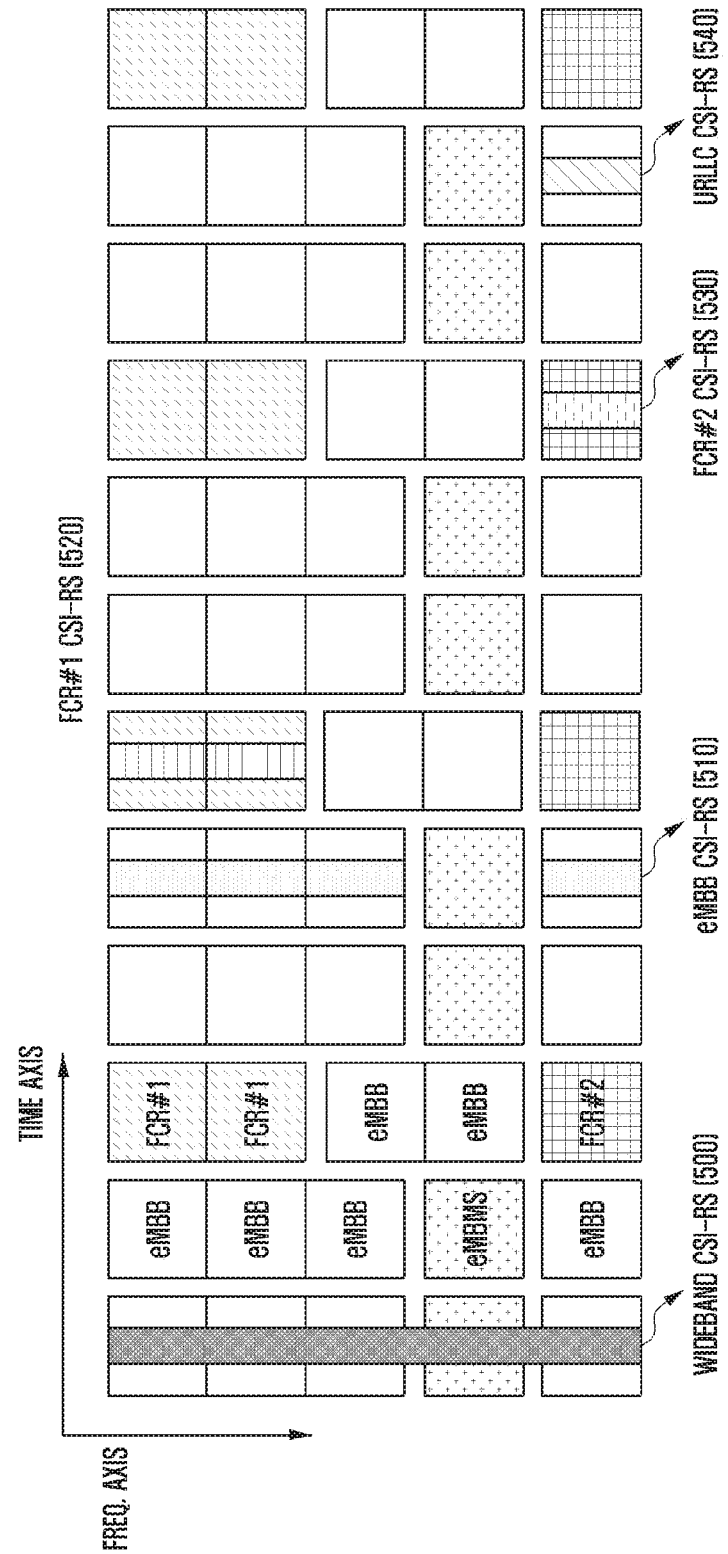
FIG. 5 is a diagram illustrating a case where services are multiplexed in time and frequency resources in an NR system.

FIG. 5 is a diagram illustrating a case where services are multiplexed in time and frequency resources in an NR system. The base station may allocate the terminal the CSI-RS in the wideband or multiple bands as indicated by 500 in order to obtain initial channel state information. This wideband or multi-band CSI-RS may be disadvantageous for optimizing the system performance because of requiring a large amount of reference signal overhead, but this wideband or multi-band CSI-RS transmission may be necessary in case where there is no information obtained in advance. After the wideband or multi-band CSI-RS transmission, respective services may be provided together with different requirements, and thus the accuracy and update necessity of channel state information required may be changed. Therefore, after obtaining the initial channel state information, the base station may trigger subband CSI-RSs 510, 520, 530, and 540 for respective services in the corresponding bands in response to needs of such services. Although FIG. 5 illustrates CSI-RS transmission for one service at one time point, it is also possible to transmit the CSI-RSs for a plurality of services as needed.

As described above in Tables 1, 2 and 3, the LTE system supports periodic CSI-RS transmission. This periodic CSI-RS transmission allows the terminal to periodically measure resources and also periodically perform CSI reporting. However, this periodic CSI-RS transmission may be unfavorable for supporting terminals of post LTE systems. For example, when the above-described CSI-RS pattern of the LTE system is different from the CSI-RS pattern of the NR system, a ZP CSI-RS resource may be further required for rate matching of the corresponding resource. In addition, when the form of the CSI-RS to be supported later in the NR system is different from that of the existing CSI-RS, the existing NR terminal and the future NR terminal should support and use different CSI-RS patterns. In this case, periodic CRI-RS configuring may further increase the overhead. Accordingly, the following aperiodic CSI-RS transmission methods may be considered.

A first aperiodic CSI-RS resource configuring and triggering method is a method of configuring in advance a plurality of aperiodic CSI-RS resources and triggering some of the configured resources.

A second aperiodic CSI-RS resource configuring and triggering method is a method of configuring in advance a plurality of aperiodic CSI-RS resources, activating some of the configured resources, and triggering some of the activated resources.

A third aperiodic CSI-RS resource configuring and triggering method is a method of configuring in advance a plurality of aperiodic CSI-RS resources, performing the transmission of a corresponding CSI-RS resource in response to activation, and periodically the CSI-RS until the corresponding resource is inactivated.

The first aperiodic CSI-RS resource configuring and triggering method is a method of configuring in advance a plurality of aperiodic CSI-RS resources and triggering some of the configured resources. According to this method, because a plurality of resources should be always configured dynamically and all the number of configuring cases should be supported, the complexity of the terminal may be relatively large. The second method is a method of supporting the dynamical transmission of only some of the configured resources. In this case, because the number of transmittable CSI-RS resources is relatively small, the terminal complexity is less than 1 and the dynamic CSI-RS transmission is also possible. The third method is to configure a plurality of resources and periodically transmit all or some of them by using a semi-persistent scheduling (SPS) concept. Therefore, the hardware change and complexity increase of the terminal may be significantly smaller than those of the first and second methods.

In supporting the aperiodic CSI-RS transmission, activating and inactivating operations and triggering operation may be delivered using a DCI or MAC control element (CE) signal. Also, in supporting the triggering method, supporting a plurality of CSI-RS transmission methods may be considered together. The CSI-RS transmission according to the third aperiodic CSI-RS resource configuring and triggering method may be referred to as a semi-persistent (periodic) CSI-RS instead of the aperiodic CSI-RS.

Figure 6:
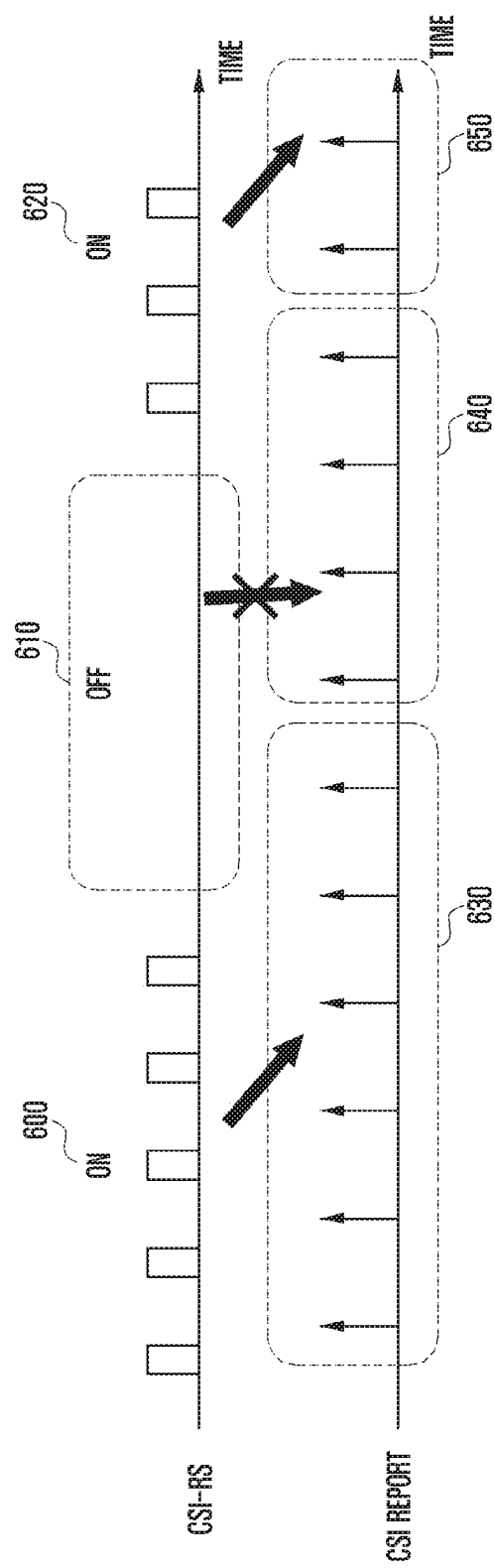
FIG. 6 is a diagram illustrating a problem in performing periodic reporting of channel state information through an aperiodic CSI-RS.

If periodic channel state information reporting is supported through the aperiodic CSI-RS or semi-persistent CSI-RS, the channel state information reporting may be problematic as shown in FIG. 6. FIG. 6 is a diagram illustrating a problem in performing periodic reporting of channel state information through an aperiodic CSI-RS.

In FIG. 6, the terminal generates the channel state information through the aperiodic CSI-RS or semi-persistent CSI-RS configured and transmitted by the base station and periodically reports the channel state information. Because the base station configures the CSI-RS transmission at 600 and 620, the terminal can generate and report the channel state information at 630 and 650. However, in case of 640, there is no resource measured by the terminal because the CSI-RS is not configured nor transmitted at 610. Therefore, in this case, the terminal may use the following methods for periodic channel state reporting.

A first periodic channel state reporting method in case where the CSI-RS is not configured nor transmitted (when there is no resource to be measured) is not to report the periodic channel state information.

A second periodic channel state reporting method in case where the CSI-RS is not configured nor transmitted is a method of measuring the channel state information through a synchronization signal and any other reference signal and reporting the periodic channel state information through this.

The first periodic channel state information reporting method is a method of not reporting the periodic channel state information when resources to be measured do not exist. As described above, when there is no CSI-RS resource to be newly measured and updated by the terminal due to no transmission of the CSI-RS, the terminal does not report the non-updated periodic channel state information, thereby reducing energy consumption and saving uplink transmission resources.

The second periodic channel state information reporting method is a method of measuring the periodic channel state information through a synchronization signal and any other reference signal. As mentioned above, in the NR system, it is necessary to minimize the reference signal transmitted at all times or periodically. However, in order for the terminal to perform cell identification and initial access and radio resource management (RRM), the synchronization signal or the reference signal for measurement needs to be transmitted periodically and fixedly. Thus, when the periodic channel state information is measured through the synchronization signal and any other reference signal, the terminal can roughly measure and report the channel state information with the corresponding base station.

Figure 7A:
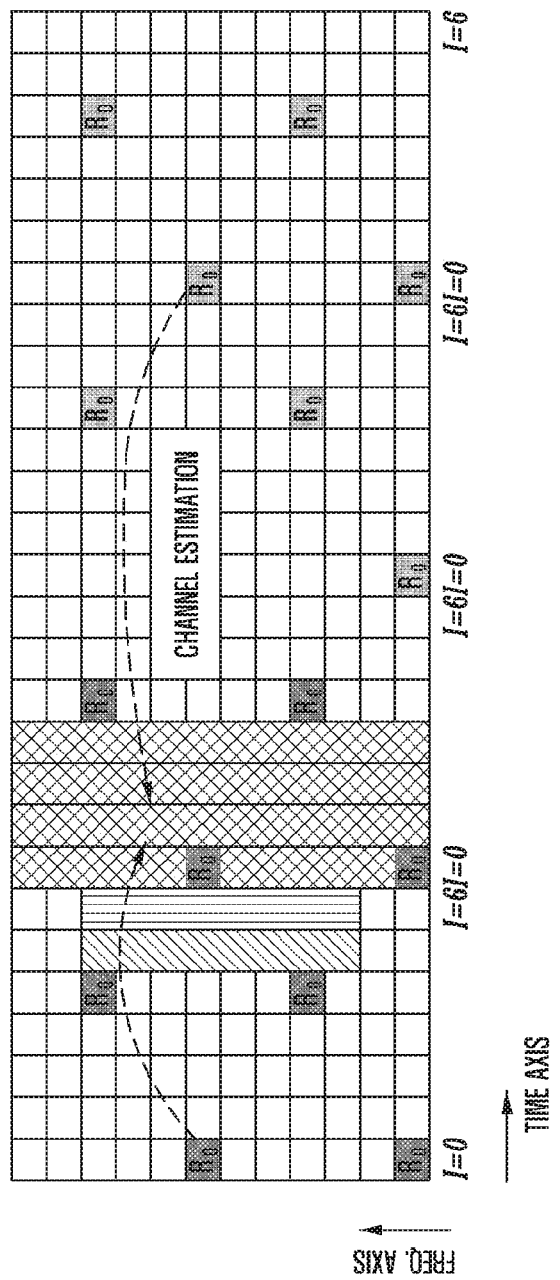
FIGS. 7A and 7B comparatively show, using PBCH for example, a physical channel decoding based on a synchronization signal in the NR system and a physical channel decoding based on a CRS in the LTE system.
Figure 7B:
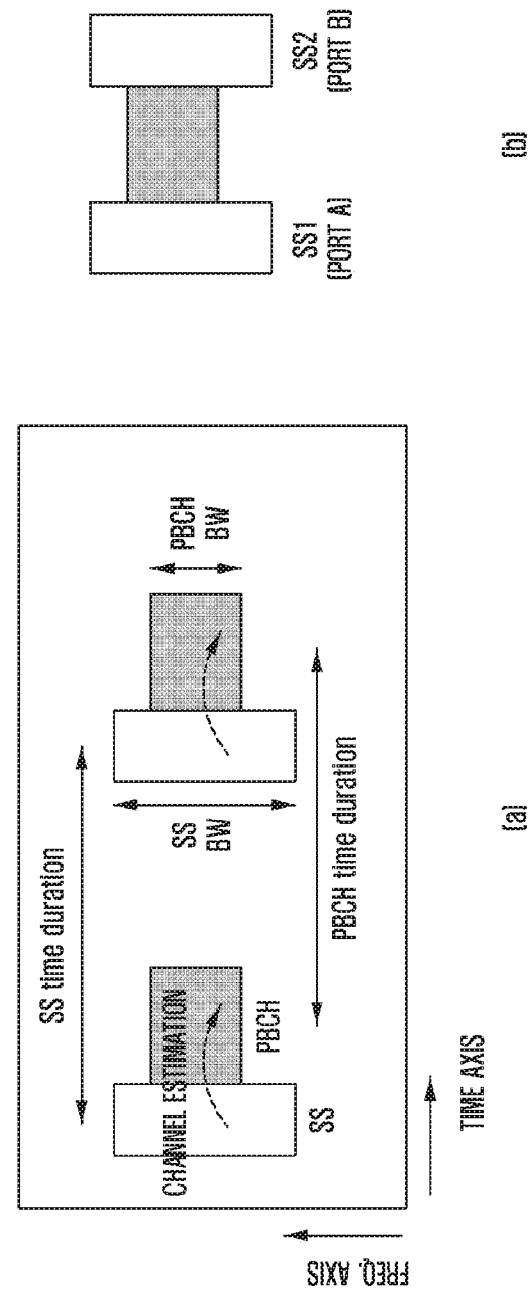

FIGS. 7A and 7B comparatively show, using PBCH for example, a physical channel decoding based on a synchronization signal in the NR system and a physical channel decoding based on a CRS in the LTE system.

FIG. 7A shows the PBCH decoding based on the CRS in the LTE system. The terminal estimates a channel, based on CRS resources transmitted in a plurality of time and frequency resources, and generates information by using channel information in the PBCH decoding. This method can perform relatively accurate channel estimation because the CRSs are transmitted in a large number of time and frequency resources. However, there is a disadvantage that the overhead required for the reference signal transmission is large. FIG. 7B shows the synchronization signal transmission available in the NR system and the PBCH decoding using the same. The terminal estimates a channel through the synchronization signal and decodes the PBCH. This method has an advantage that no overhead is required for additional reference signal transmission.

In order to measure the channel state information through the synchronization signal and generate the channel state information (RI, CQI, PMI, etc.), an antenna port number may be assigned to the synchronization signal supported by the corresponding system. As described above, in the LTE system, when the frame timing and the physical layer cell ID are acquired, the CRS port supported by the corresponding cell can be received. Therefore, in order to receive important cell system information, the terminal can measure the channel state by using the CRS, generate the channel state information, and estimate a main physical layer channel such as the PBCH or the PDSCH.

However, when channel estimation for a main physical layer channel is to be performed using the synchronization signal, the physical layer channel is transmitted by supporting a plurality of antenna ports. However, when an antenna port configuration is not supported for the synchronization signal, it may be impossible to perform channel estimation for the physical layer by using the synchronization signal. Therefore, the antenna port number may be assigned to the synchronization signal. Based on the antenna port number assigned to the synchronization signal, the synchronization signal may be used for the generation of the channel state information and the decoding for the physical layer channel.

Table 14 below shows an exemplary case where the number of antenna ports for the synchronization signal is defined as 1, 2 and 4. In this case, A, B, C and D indicate the antenna port indexes, which may be represented by specific numbers in case of a real standard.

TABLE 14

---
An antenna port is defined such that the channel over which a symbol on the antenna port is convecyed can be inferred from the channel over which another symbol on the same antenna port is conveyed. The antenna ports supported can be defined as:
Synchronization signal supports a configuration of one, two, or four antenna ports and are transmitted on antenna ports
p = A, p ∈ {A, B}, p ∈ {A, B, C, D}, respectively.

---

The synchronization signal may be divided into a plurality of signals by using a method such as time division multiplexing (TDM), frequency division multiplexing (FDM), or code division multiplexing (CDM). For channel estimation for a plurality of antennas required for channel state information generation and physical layer channel decoding, a plurality of antenna port indexes may be differently assigned to the respective synchronization signals.

Figure 8A:
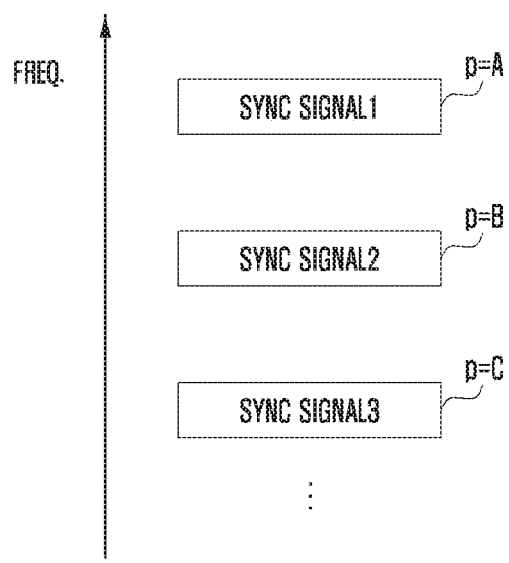
FIGS. 8A and 8B are diagrams showing synchronization signals transmitted separately in time and frequency resources.
Figure 8B:
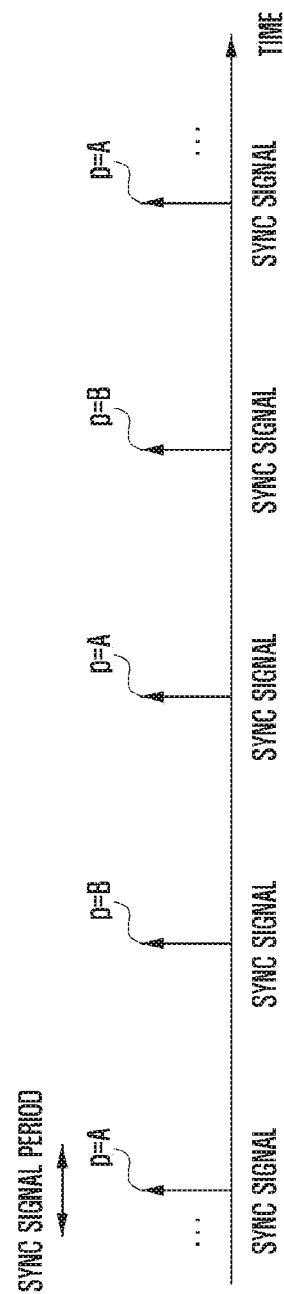

A first method is a method of matching a plurality of synchronization signals to different antenna ports when the synchronization signals distinguished by different resources are supported. FIGS. 8A and 8B are diagrams showing synchronization signals transmitted separately in time and frequency resources. For example, if two synchronization signals are supported, a synchronization signal 1 may be matched to an antenna port index A, and a synchronization signal 2 may be matched to an antenna port index B. In the LTE system, signals distinguished as PSS and SSS are used for synchronization, and the transmission positions of the PSS and the SSS are varied depending on whether a cell operates with FDD or TDD. Because the transmission positions of the PSS and the SSS are distinguished in the time and frequency domains within a frame, it is possible to assign different port indexes to the respective signals. In addition, a synchronization signal at a specific time point separated in time with respect to a plurality of antenna ports may be matched to the antenna port index A, and a synchronization signal at another time point may be matched to the antenna port index B. In this way, it is possible to extendedly match a plurality of antenna ports to synchronization signals distinguished in time. In addition, a plurality of antenna ports may be allocated to synchronization signals distinguished in frequency. Also, synchronization signals to which different antenna ports are allocated may be simultaneously distinguished in the allocated time and frequency band and also distinguished based on codes.

Unlike the above embodiment, a synchronization signal may be used on the assumption that the synchronization signal has the same antenna port as that of a channel used for channel state information generation and physical layer channel decoding. Table 15 is an example in which one antenna port for a synchronization signal is defined, and Table 16 shows an example in which an antenna port for a synchronization signal is not separately defined on the assumption that a physical layer channel and a synchronization signal use the same antenna port.

TABLE 15

---
An antenna port is defined such that the channel over which a symbol on the antenna port is conveyced can be inferred from the channel over which another symbol on the same antenna port is conveyed. The antenna port supported can be defined as:
Synchronization signal supports a configuration of one port and it transmitted on antenna port p = A.
---

TABLE 16

---
A UE may assume the antenna port A and the antenna port for the synchronization signal of a serving cell are same.
---

In the examples of Tables 15 and 16, it is assumed that the synchronization signal estimates only one channel. However, this may also be applied to a plurality of signals. In addition, although the above examples are based on two synchronization signals (e.g., PSS and SSS), the number of synchronization signals may be more than two, one of which may be an extended synchronization signal (ESS).

Based on the above synchronization signal, the terminal may perform RRM measurement. As described above, in the LTE system, the terminal measures the received power by using the CRS. If the measurement value satisfies a predetermined condition, the terminal transmits a measurement report of reference signal received power (RSRP) to the base station. Based on this measurement report, the base station determines whether to perform handover. The synchronization signal proposed in the present invention may replace the CRS function for measurement, and the measurement report of RSRP may be performed as shown in Table 17 below.

TABLE 17

| | |
|---|---|
| Definition | Reference signal received power (RSRP), is defined as the linear average over the power contributions (in [W]) of the resource elements that carry cell-specific reference signals within the considered measurement frequency bandwidth. For RSRP determination the synchronization signals $R_A$ shall be used. If the UE can reliably detect that $R_B$ is available it may use $R_B$ in addition to $R_A$ to determine RSRP. If higher layers indicate measurements based on discovery signals, the UE shall measure RSRP in the subframes in the configured discovery signal occasions. If the UE can reliably detect that cell-specific reference signals are present in other subframes, the UE may use those subframes in addition to determine RSRP. |
| | The reference point for the RSRP shall be the antenna connector of the UE. |
| | If receiver diversity is in use by the UE, the reported value shall not be lower than the corresponding RSRP of any of the individual diversity branches. |
| Applicable for | RRC_IDLE intra-frequency, RRC_IDLE inter-frequency, RRC_CONNECTED intra-frequency, RRC_CONNECTED inter-frequency |

In Table 17, RA and RB are synchronization signals corresponding to the antenna port indexes A and B, and may be determined by assigning the antenna port indexes to the synchronization signals as described above.

Based on the assigned port indexes A and B of the synchronization signals, the terminal may calculate and determine RI, PMI, and CQI required for channel state information and then report them to the base station. Equation 2 below is used for such calculation.

$$\begin{bmatrix} y^{(A)}(i) \\ \cdot \\ \cdot \\ \cdot \\ y^{(A+P)}(i) \end{bmatrix} = W(i) \begin{bmatrix} x^{(0)}(i) \\ \cdot \\ \cdot \\ \cdot \\ x^{(\nu-1)}(i) \end{bmatrix}, \quad \text{[Equation 2]}$$

$$\text{where } x(i) = \begin{bmatrix} x^{(0)}(i) \ldots x^{(\nu-1)}(i) \end{bmatrix}^T$$

In the above equation, W(i) is a precoding matrix applied to a transmission signal x(i) and reported by the terminal, and P is the number of antenna ports supported through a synchronization signal.

The RI that can be reported by the base station in the channel state report based on the synchronization signal may be limited more than when the corresponding information is generated based on the CSI-RS. This is because, although the synchronization signal needs signals separated in time, frequency, and code in order to support a plurality of ports, it is difficult to support a large number of separated synchronization signals due to the characteristics of the synchronization signal. For example, if the number of antennas configured for the CSI-RS is 8, and if the number of antennas of the terminal is 4, the terminal can report the channel state information by assuming the maximum rank of 4 in the CSI-RS based channel state report. However, in the report based on the synchronization signal, the maximum rank may be limited to two. In addition to the above, the use of transmission diversity, not reporting the PMI and the RI, or large delay cyclic delay diversity (CDD) may be assumed in the channel state report based on the synchronization signal. Equations 3 and 4 exemplarily show acquiring the channel state information for such transmission diversity and large delay CDD, based on the synchronization signal.

$$\begin{bmatrix} y^{(A)}(2i) \\ y^{(B)}(2i) \\ y^{(A)}(2i+1) \\ y^{(B)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix} \quad \text{[Equation 3]}$$

$$\begin{bmatrix} y^{(A)}(i) \\ \cdot \\ \cdot \\ \cdot \\ y^{(A+P-1)}(i) \end{bmatrix} = W(i)D(i)U \begin{bmatrix} x^{(0)}(i) \\ \cdot \\ \cdot \\ \cdot \\ x^{(v-1)}(i) \end{bmatrix} \quad \text{[Equation 4]}$$

In the channel state report based on the synchronization signal, the channel state report information in Equations 2, 3 and 4 may be configured using the RRC field or only partly supported through the standard. In the current LTE system, the RI and PMI report may be configured through a field called PMI/RI reporting. When the PMI/RI report required for the channel state report is configured through this field, the channel states report based on the synchronization signal is generated and reported on the basis of Equation 2. Unless configured, the channel state report may be generated and reported on the basis of Equation 3 or 4.

As described above, because, although the synchronization signal needs signals separated in time, frequency, and code in order to support a plurality of ports, it is difficult to support a large number of separated synchronization signals due to the characteristics of the synchronization signal, it is possible to always support the transmission diversity of Equation 3 or support the transmission diversity and/or the large delay CDD of Equations 3 and 4 in order to obtain the average channel state information. When only the transmission diversity of Equation 3 is supported, the RI reporting is not necessary for the channel state report based on the synchronization signal. Also, based on this, the base station may identify whether the corresponding report is information based on the CSI-RS or information based on the synchronization signal. When the transmission diversity and the large delay CDD of Equations 3 and 4 are simultaneously supported, the RI reporting is required. In this case, the corresponding RI information may be limited in comparison with the CSI-RS based channel state report as in Equation 2.

Although the transmission diversity and the large delay CDD are described hereinbefore, a beam-based diversity technique, a semi-open loop, a semi-dynamic beamforming, and the like may be further supported. Also, in addition to Equations 2, 3 and 4, only the CQI may be reported assuming one antenna port when reporting the channel state information based on the synchronization signal.

As describe above in FIG. 6, the channel state reporting based on the synchronization signal may be a method for notifying approximate information of the corresponding link in a situation incapable of transmitting and configuring the CSI-RS rather than in a normal situation. Therefore, a method for configuring and reporting the channel state report based on the synchronization signal is as follows.

A first method for configuring and reporting the channel state report based on the synchronization signal is that, instead of the CSI-RS based reference signal transmission and channel state information, the signal configuration and channel state report (based on a synchronization signal) exists independently and the terminal reports it.

A second method for configuring and reporting the channel state report based on the synchronization signal is that the terminal reports the channel state information based on the synchronization signal only when the CSI-RS based reference signal is not configured and not transmitted.

The first method for configuring and reporting the channel state report based on the synchronization signal is a method of allowing the signal configuration and channel state report to be performed independently based on the synchronization signal rather than the CSI-RS based reference signal transmission and channel state information. In this method, a separate channel state reporting unit is given such as the CSI process of the existing LTE system or the resource set per vertical (which may be understood as a service) supported by the NR system. Here, one unit is to measure and report the channel state based on the CSI-RS, and another unit is to measure and report the channel state based on the synchronization signal. Therefore, the RS transmission configuration (For example, a cell ID, a transmission and reception point (TRP) ID, and a beam ID may be configured for a synchronization signal, and a system band configuration may be further performed) and the channel state reporting configuration may be made completely independent of the channel state reporting configuration based on the CSI-RS. This method has an advantage that the base station can freely adjust the channel state reporting time point.

The second method for configuring and reporting the channel state report based on the synchronization signal is that the terminal reports the channel state information based on the synchronization signal only when the CSI-RS based reference signal is not configured and not transmitted. As mentioned above, the channel state reporting based on the synchronization signal may be a method for notifying approximate information of the corresponding link in a situation incapable of transmitting and configuring the CSI-RS rather than in a normal situation. Therefore, the channel state reporting based on the synchronization signal is not always performed but may be required only when the CSI-RS transmission and configuration are not performed. In this case, the channel state report configuration for the synchronization signal may be information associated with the CSI-RS based channel state information. For example, the cell ID, the TRP ID, the beam ID, etc. may share a scrambling ID for the CSI-RS. The channel state report configuration may also be shared (such as a reporting period or a subframe offset), but some information (such as PMI/RI reporting) may be additionally configured.

Figure 9:
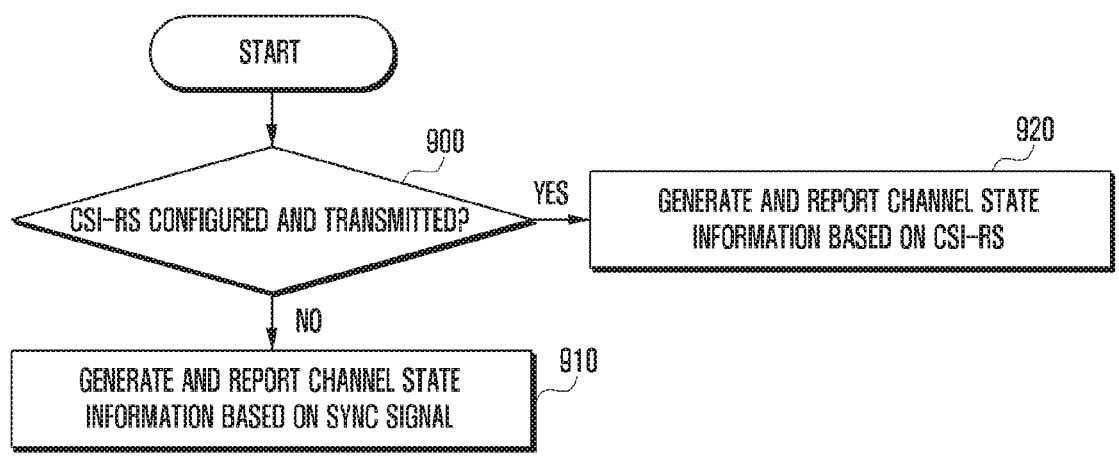
FIG. 9 is a flow diagram illustrating a method of a terminal for configuring a channel state report and reporting a channel state.

FIG. 9 is a flow diagram illustrating the second method for configuring and reporting the channel state report performed by a terminal.

At step 900, the terminal checks whether a CSI-RS is configured and transmitted. When the CSI-RS is configured and transmitted at step 900, the terminal measures a channel state based on the CSI-RS, generates channel state information, and reports the channel state information to the base station at step 920. When the CSI-RS is not configured nor transmitted at step 900, the terminal measures a channel state based on a synchronization signal, generates channel state information, and reports the channel state information to the base station at step 910 by using methods of the present invention.

In the second method, whether the CSI-RS reference signal is configured and transmitted may be checked based on a reference resource of the CSI-RS. In the LTE system, a resource being ahead of four subframes before the reporting time point in case of transmission modes (TMs) 1 to 9 and a resource being ahead of five subframes before the reporting time point in case of the TM 10 are used as reference resources for generating the corresponding channel state information (However, in case of uplink of the TDD system, the number of subframes may increase). Therefore, when the CSI-RS transmission is not configured at the reference resource time point, the terminal may use the channel state report based on the synchronization signal described in the present invention. Also, whether to report the channel state based on the synchronization signal may be determined depending on whether the CSI-RS is transmitted within a certain range (e.g., 5 subframes) from the reference resource.

In the channel state report based on the synchronization signal, the synchronization signal is transmitted in part rather than in the entire system band, so that it may be difficult to generate and report the entire channel state information. In order to solve this problem, the following methods may be considered.

A first method for generating the channel state information based on the synchronization signal is to perform both a wideband channel state report and a subband channel state report, based on the synchronization signal.

A second method for generating the channel state information based on the synchronization signal is to perform only the wideband channel state report, based on the synchronization signal.

A third method for generating the channel state information based on the synchronization signal is to perform only the subband channel state report, based on the synchronization signal.

The first method for generating the channel state information based on the synchronization signal is a method in which the terminal performs both the wideband channel state report and the subband channel state report on the basis of the synchronization signal. This method is to generate and report even information on a band in which the synchronization signal is not transmitted, and at this time, information estimated and generated through the CSI-RS may be used together. This has an advantage that the terminal can provide the maximum amount of information to the base station.

The second method for generating the channel state information based on the synchronization signal is a method in which the terminal performs only the wideband channel state report on the basis of the synchronization signal. This method is to estimate the system performance of the entire band on the basis of the transmitted synchronization signal and to report only simplified wideband information, thereby simplifying information and also providing the minimum amount of radio link information.

The third method for generating the channel state information based on the synchronization signal is a method in which the terminal performs only the subband channel state report on the basis of the synchronization signal. In this method, the terminal reports, to the base station, the channel state information only for a subband in which the synchronization signal exists. Therefore, even though the amount of information reported is relatively small, it is possible to provide accurate information.

Depending on the above methods for generating the channel state information, channel state information in a band where the synchronization signal is not transmitted may be required. In this case, the terminal may use the following methods for generating the required information.

A first method for generating the channel state information in a band where the synchronization signal is not transmitted is to estimate such a band through a channel estimation technique (interpolation, extrapolation, etc.) and thereby generate the channel state information.

A second method for generating the channel state information in a band where the synchronization signal is not transmitted is to report channel state information to the base station except for reporting the channel state information of the frequency band of the portion where the synchronization signal is not transmitted.

The above-described first method is a method in which the terminal estimates the non-transmission band of the synchronization signal through interpolation or extrapolation and then generates the channel state information. The terminal may estimate a channel value of such a band, based on a value measured through the synchronization signal. The channel value may be estimated using values measured in different time resources of the same frequency or in different frequency resources of the same time, or depending on the situation, both of them may be used for estimation. The use of interpolation, extrapolation, or any other technique may be considered for such estimation.

The above-described second method is a method of not using the channel state information on the non-transmission band of the synchronization signal. The channel state information reporting needs uplink resources. If corresponding information is invalid, the channel state information may not be transmitted to increase the reliability of uplink transmission and save resources. This method is capable of improving the accuracy of channel state reporting by reporting the channel state information only for a band in which accurate measurement is performed, whereas having a disadvantage that the channel state information is not obtained for the non-transmission band of the synchronization signal. Also, for the above method, a promise that the channel state information will not be reported for a band in which the synchronization signal is transmitted between the terminal and the base station should be given in the standard.

In addition, the above-described first and second channel state information generation methods may be used interchangeably. For example, in case of a wideband CQI or a single PMI, the first channel state information generation method may be used to generate and report the channel state information for the non-transmission band of the synchronization signal. However, when the synchronization signal is not transmitted in a subband necessary for reporting, the channel state information on the subband may not be reported to the base station because of being inaccurate and thereby unnecessary.

Although the periodic channel state reporting method is described hereinbefore by using the synchronization signal for example, this may be also applied to all kinds of reference signals (e.g., a reference signal (RS) for measuring the RRM in an idle state, a measurement RS, a beam measurement RS, a beam RS, a phase RS, a phase compensation RS) other than the CSI-RS for generating the channel state information report. In addition, although the above description is based on the downlink, the same may be also applied to the uplink by changing the roles of the terminal and the base station.

In addition, although the above description considers only the reference signal for acquiring the channel state information, the CSI-IM for interference measurement may be also used in the same manner. For example, when there is no CSI-IM configuration in a reference resource for reporting the channel state information, it is possible to measure interference on the basis of a reference signal for any other specific purpose or a predefined synchronization signal and then apply it to the channel state reporting.

In addition, although the above description is based on the periodic CSI-RS, it may be equally applied to the aperiodic CSI-RS and the semi-persistent CSI-RS and also applied to the DMRS capable of obtaining the channel state information.

Figure 10:
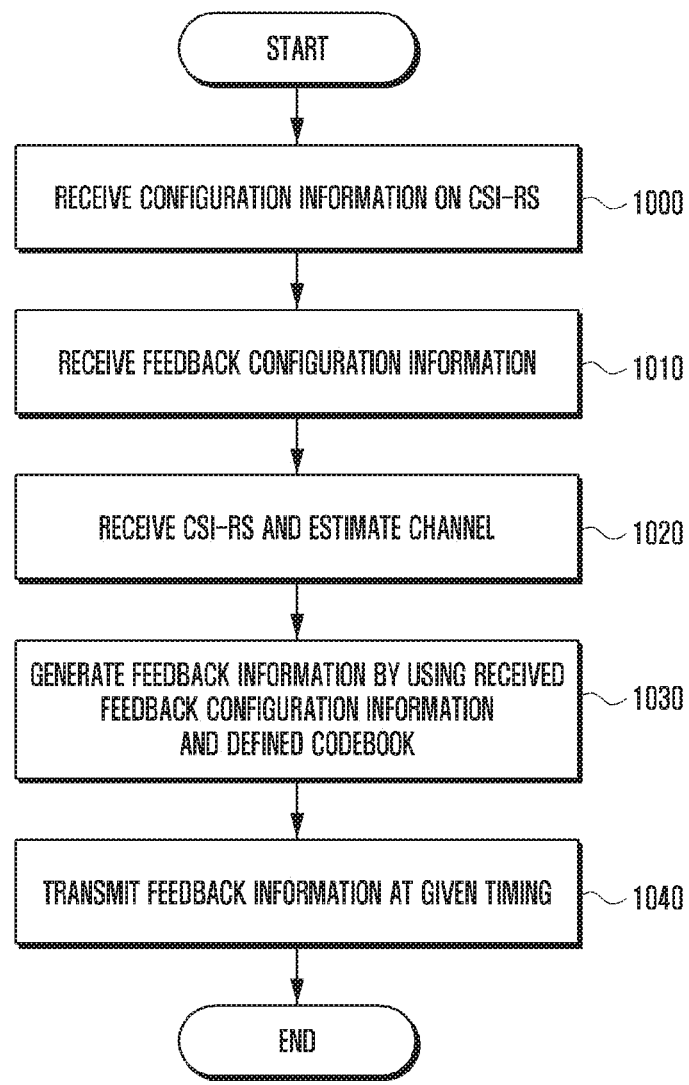
FIG. 10 is a flow diagram illustrating operations of a terminal according to an embodiment of the present invention.

FIG. 10 is a flow diagram illustrating operations of a terminal according to an embodiment of the present invention.

Referring to FIG. 10, at step 1000, the terminal receives configuration information on a CSI-RS and a channel state report. This information may include configuration about at least one of a VRG related ID, a time/frequency resource position of each VRG, a service type, a service set, a supportable feedback type, or a VRG measurement subset. In addition, based on the received configuration information, the terminal may identify at least one of the number of ports for each non-precoded (NP) CSI-RS, the number of antennas N1, N2 for each dimension, the oversampling factor O1, O2 for each dimension, one subframe config for transmission of CSI-RSs and a plurality of resource configs for position configuration, codebook subset restriction related information, CSI report related information, a CSI process index, and transmission power information ($P_C$). Thereafter, at step 1010, the terminal receives single feedback configuration information based on a CSI-RS position. This information may include configuration about PMI and/or CQI period(s) and offset(s), RI period and offset, CRI period and offset, wideband and/or subband, and submode. At step 1020, the terminal receives the CSI-RS based on the above information and then estimates a channel between a transmission antenna of the base station and a reception antenna of the terminal. At step 1030, the terminal generates feedback information RI, PMI, and CQI by using the received feedback configuration, based on the estimated channel, and selects an optimal CRI, based on the feedback information. Then, at step 1040, the terminal transmits the feedback information to the base station at feedback timing according to the feedback configuration or aperiodic channel state report trigger of the base station, thereby completing the channel feedback generating and reporting process.

Figure 11:
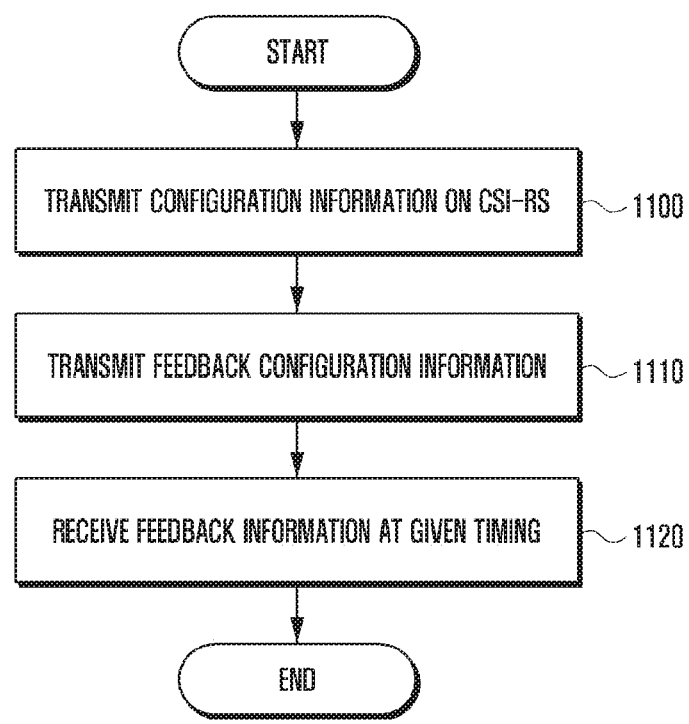
FIG. 11 is a flow diagram illustrating operations of a base station according to an embodiment of the present invention.

FIG. 11 is a flow diagram illustrating operations of a base station according to an embodiment of the present invention.

Referring to FIG. 11, at step 1100, the base station transmits configuration information on a CSI-RS for channel measurement and a channel state report to the terminal. The configuration information may include at least one of a time/frequency resource position of each VRG, a service type, a supportable feedback type, or a VRG measurement subset, and in order to transmit the CSI-RS based on the configuration information, may include at least one of the number of ports for each NP CSI-RS, the number of antennas N1, N2 for each dimension, the oversampling factor O1, O2 for each dimension, one subframe config for transmission of CSI-RSs and a plurality of resource configs for position configuration, codebook subset restriction related information, CSI report related information, a CSI process index, and transmission power information ($P_C$). Thereafter, at step 1110, the base station transmits the feedback configuration information based on at least one CSI-RS to the terminal. This information may include configuration about PMI and/or CQI period(s) and offset(s), RI period and offset, CRI period and offset, wideband and/or subband, and submode. Then, the base station transmits the configured CSI-RS to the terminal. The terminal estimates a channel for each antenna port and, based on this, estimates an additional channel for a virtual resource. The terminal determines a feedback, generates corresponding CRI, PMI, RI and CQI, and transmits them to the base station. Therefore, at step 1120, the base station receives feedback information from the terminal at a predetermined timing and uses it in determining a channel state between the terminal and the base station.

Figure 12:
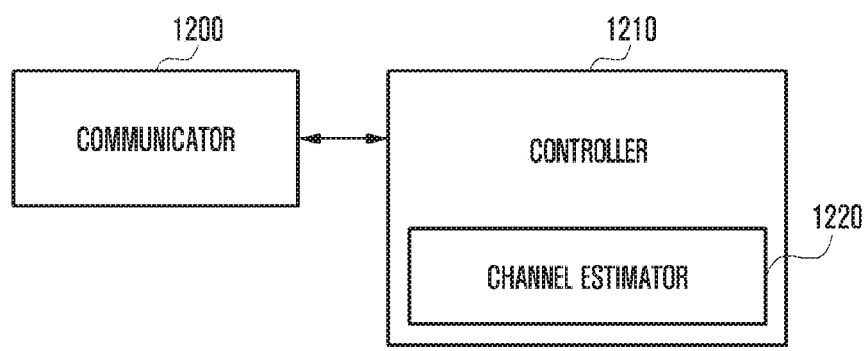
FIG. 12 is a block diagram illustrating an internal structure of a terminal according to an embodiment of the present invention.

FIG. 12 is a block diagram illustrating an internal structure of a terminal according to an embodiment of the present invention.

Referring to FIG. 12, the terminal includes a communicator 1200 and a controller 1210. The communicator 1200 performs a function of transmitting or receiving data to or from an external device (e.g., a base station). Specifically, the communicator 1200 may transmit feedback information to the base station under the control of the controller 1210. The controller 1210 controls the states and operations of all elements that constitute the terminal. Specifically, the controller 1210 generates feedback information according to information allocated by the base station. In addition, the controller 1210 controls the communicator 1200 to feed back generated channel information to the base station according to timing information allocated by the base station. For this, the controller 1210 may include a channel estimator 1220. The channel estimator 1220 determines the position of corresponding VRG in the time and frequency resources through a VRG service and the feedback information received from the base station. Also, the channel estimator 1220 identifies necessary feedback information through a related CSI-RS and feedback allocation information and estimates a channel, based on the feedback information and by using the received CSI-RS.

Although FIG. 12 shows that the terminal is composed of the communicator 1200 and the controller 1210, the terminal may further include various elements according to functions performed in the terminal. For example, the terminal may further include a display for displaying a current state of the terminal, an input device for entering a user input of performing a function, a storage for storing data generated in the terminal, and the like. Although the channel estimator 1220 is illustrated as being included in the controller 1210, the present invention is not limited thereto. The controller 1210 may control the communicator 1200 to receive configuration information for each of at least one reference signal resource from the base station. In addition, the controller 1210 may control the communication unit 1200 to receive, from the base station, feedback configuration information for measuring the at least one reference signal and generating feedback information according to the measurement result.

In addition, the controller 1210 may measure at least one reference signal received through the communicator 1200 and generate feedback information according to the feedback configuration information. The controller 1210 may control the communication unit 1200 to transmit the generated feedback information to the base station at feedback timing according to the feedback configuration information. Also, the controller 1210 may receive the CSI-RS from the base station, generate the feedback information based on the received CSI-RS, and transmit the generated feedback information to the base station.

In addition, the controller 1210 may receive the CSI-RS from the base station, generate the feedback information based on the received CSI-RS, and transmit the generated feedback information to the base station. At this time, the controller 1210 may select one precoding matrix for all antenna port groups of the base station. Also, the controller 1210 may receive the feedback configuration information from the base station, receive the CSI-RS from the base station, generate the feedback information based on the received feedback configuration information and the received CSI-RS, and transmit the generated feedback information to the base station.

Figure 13:
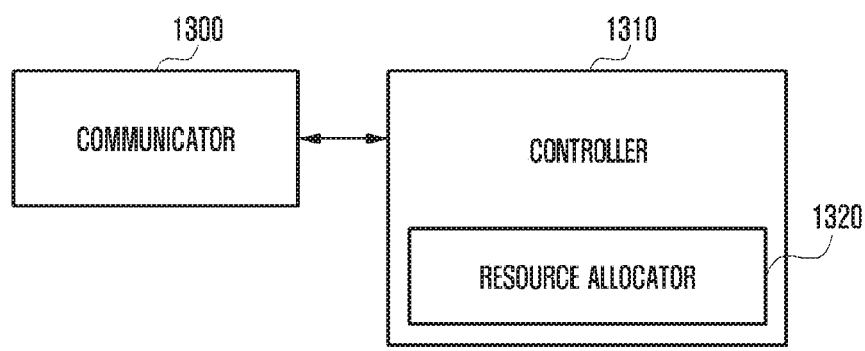
FIG. 13 is a block diagram illustrating an internal structure of a base station according to an embodiment of the present invention.

FIG. 13 is a block diagram illustrating an internal structure of a base station according to an embodiment of the present invention.

Referring to FIG. 13, the base station includes a controller 1310 and a communicator 1300. The controller 1310 controls the states and operations of all elements that constitute the base station. Specifically, the controller 1310 assigns CSI-RS resources for channel estimation and related configuration for acquiring VRG information to the terminal, and allocates feedback resources and feedback timing to the terminal. For this, the controller 1310 may include a resource allocator 1320. Also, the controller 1310 allocates feedback configuration and feedback timing so that feedback from the terminals does not collide, and receives and analyzes configured feedback information at the corresponding timing. The communicator 1300 performs a function of transmitting or receiving data, reference signals, and feedback information to or from the terminal. Specifically, the communicator 1300 transmits the CSI-RS to the terminal through allocated resources under the control of the controller 1310, and receives feedback on channel information from the terminal. Also, the communicator 1300 transmits the reference signal, based on CRI, RI, PMI partial information, CQI, etc. obtained from channel state information transmitted by the terminal.

Although the resource allocator 1320 is illustrated as being included in the controller 1310, the present invention is not limited thereto. The controller 1310 may control the communicator 1300 to transmit configuration information for each of at least one reference signal to the terminal, or may generate the at least one reference signal. In addition, the controller 1310 may control the communicator 1300 to transmit feedback configuration information for generating feedback information according to the measurement result to the terminal. In addition, the controller 1310 may control the communicator 1300 to transmit the at least one reference signal to the terminal and receive feedback information from the terminal at a feedback timing according to the feedback configuration information. In addition, the controller 1310 may transmit feedback configuration information to the terminal, transmit a CSI-RS to the terminal, and receive feedback information generated based on the feedback configuration information and the CSI-RS from the terminal. Also, the controller 1310 may transmit CSI-RS beamformed based on feedback information to the terminal, and receive feedback information generated based on the CSI-RS from the terminal.

The invention claimed is:

1. A method for receiving channel state information (CSI) of a base station in a wireless communication system, the method comprising:
   transmitting, to a terminal, first configuration information associated with a synchronization signal, and second configuration information associated with a CSI-reference signal (RS); and
   receiving a CSI report from the terminal,
   wherein the CSI report includes first CSI based on the synchronization signal in case that the first configuration information associated with the synchronization signal is used for the CSI report, and the CSI report includes second CSI based on the CSI-RS in case that the second configuration information associated with the CSI-RS is used for the CSI report,
   wherein the first configuration information associated with the synchronization signal configures the CSI report to include the first CSI based on the synchronization signal,
   wherein the second configuration information associated with the CSI-RS configures the CSI report to include the second CSI based on the CSI-RS,
   wherein the first CSI includes reference signal received power (RSRP) information for wideband based on the synchronization signal and a signal-to-noise and interference ratio (SINR) based on the synchronization signal, and
   wherein a single antenna port is defined for the synchronization signal and a physical channel associated with the synchronization signal is transmitted based on the single antenna port.

2. The method of claim 1, wherein the first configuration information associated with the synchronization signal is independent from the second configuration information associated with the CSI-RS.

3. A method for channel state information (CSI) of a terminal in a wireless communication system, the method comprising:
   receiving, from a base station, first configuration information associated with a synchronization signal, and second configuration information associated with a CSI-reference signal (RS);
   generating a CSI report, wherein the CSI report includes first CSI based on the synchronization signal in case that the first configuration information associated with the synchronization signal is used for the CSI report, and the CSI report includes second CSI based on the CSI-RS in case that the second configuration information associated with the CSI-RS is used for the CSI report; and
   transmitting the CSI report to the base station,
   wherein the first configuration information associated with the synchronization signal configures the CSI report to include the first CSI based on the synchronization signal,
   wherein the second configuration information associated with the CSI-RS configures the CSI report to include the second CSI based on the CSI-RS,
   wherein the first CSI includes reference signal received power (RSRP) information for wideband based on the synchronization signal and a signal-to-noise and interference ratio (SINR) based on the synchronization signal, and
   wherein a single antenna port is defined for the synchronization signal and a physical channel associated with the synchronization signal is received based on the single antenna port.

4. The method of claim 3, wherein the first configuration information associated with the synchronization signal is independent from the second configuration information associated with the CSI-RS.

5. A base station in a wireless communication system, the base station comprising:
   a transceiver; and
   a controller coupled with the transceiver and configured to:

transmit, to a terminal, first configuration information associated with a synchronization signal and second configuration information associated with a channel state information (CSI)-reference signal (RS); and receive a CSI report from the terminal, wherein the CSI report includes first CSI based on the synchronization signal in case that the first configuration information associated with the synchronization signal is used for the CSI report, and the CSI report includes second CSI based on the CSI-RS in case that the second configuration information associated with the CSI-RS is used for the CSI report, wherein the first configuration information associated with the synchronization signal configures the CSI report to include the first CSI based on the synchronization signal, wherein the second configuration information associated with the CSI-RS configures the CSI report to include the second CSI based on the CSI-RS, wherein the first CSI includes reference signal received power (RSRP) information for wideband based on the synchronization signal and a signal-to-noise and interference ratio (SINR) based on the synchronization signal, and wherein a single antenna port is defined for the synchronization signal and a physical channel associated with the synchronization signal is received based on the single antenna port.

6. The base station of claim 5, wherein the first configuration information associated with the synchronization signal is independent from the second configuration information associated with the CSI-RS.

7. A terminal in a wireless communication system, the terminal comprising:

a transceiver; and a controller coupled with the transceiver and configured to receive, from a base station, first configuration information associated with a synchronization signal, and second configuration information associated with a channel state information (CSI)-reference signal (RS);

generate a CSI report, wherein the CSI report includes first CSI based on the synchronization signal in case that the first configuration information associated with the synchronization signal is used for the CSI report, and the CSI report includes second CSI based on the CSI-RS in case that the second configuration information associated with the CSI-RS is used for the CSI report; and transmit the CSI report to the base station, wherein the first configuration information associated with the synchronization signal configures the CSI report to include the first CSI based on the synchronization signal, wherein the second configuration information associated with the CSI-RS configures the CSI report to include the second CSI based on the CSI-RS, wherein the first CSI includes reference signal received power (RSRP) information for wideband based on the synchronization signal and a signal-to-noise and interference ratio (SINR) based on the synchronization signal, and wherein a single antenna port is defined for the synchronization signal and a physical channel associated with the synchronization signal is received based on the single antenna port.

8. The terminal of claim 7, wherein the first configuration information associated with the synchronization signal is independent from the second configuration information associated with the CSI-RS.

* * * * *